US011721064B1

(12) United States Patent
Aksoy et al.

(10) Patent No.: US 11,721,064 B1
(45) Date of Patent: Aug. 8, 2023

(54) ADAPTIVE RATE SHADING USING TEXTURE ATLAS

(71) Applicant: Meta Platforms Technologies, LLC, Menlo Park, CA (US)

(72) Inventors: Volga Aksoy, Redwood City, CA (US); Reza Nourai, Danville, CA (US); Brian Funt, West Vancouver (CA); Haomiao Jiang, Cupertino, CA (US); Curtis Buckoll, Vancouver (CA)

(73) Assignee: Meta Platforms Technologies, LLC, Menlo Park, CA (US)

( * ) Notice: Subject to any disclaimer, the term of this patent is extended or adjusted under 35 U.S.C. 154(b) by 76 days.

(21) Appl. No.: 17/220,771

(22) Filed: Apr. 1, 2021

Related U.S. Application Data

(60) Provisional application No. 63/124,576, filed on Dec. 11, 2020.

(51) Int. Cl.
| | | |
|---|---|---|
| *G06T 15/80* | (2011.01) | |
| *G06T 15/20* | (2011.01) | |
| *H04L 67/10* | (2022.01) | |
| *G06N 20/00* | (2019.01) | |
| *G06T 15/04* | (2011.01) | |

(52) U.S. Cl.
CPC ............. *G06T 15/80* (2013.01); *G06N 20/00* (2019.01); *G06T 15/04* (2013.01); *G06T 15/20* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 10,755,474 B1* | 8/2020 | Schneider | ............. G06T 15/506 |
| 11,094,075 B1 | 8/2021 | Lanman et al. | |
| 2002/0158873 A1 | 10/2002 | Williamson | |
| 2004/0151390 A1 | 8/2004 | Iwamura | |
| 2008/0001962 A1 | 1/2008 | Lefebvre et al. | |
| 2009/0208110 A1 | 8/2009 | Hoppe et al. | |

(Continued)

OTHER PUBLICATIONS

Broxton M., et al., "Immersive Light Field Video with a Layered Mesh Representation," ACM Transactions on Graphics, Article 86, Jul. 2020, vol. 39 (4), 15 pages.

(Continued)

*Primary Examiner* — Nurun Flora
(74) *Attorney, Agent, or Firm* — Baker Botts L.L.P.

(57) ABSTRACT

In one embodiment, a method includes a server generating first shading information for visible portions of objects relative to a first viewpoint, storing the first shading information in a texture atlas, and sending the texture atlas to a client device. The method also includes determining a first subset of the visible portions of the objects for which shading information is to be re-generated and a second subset for which elements of the first shading information are to be reused, generating second shading information for the first subset relative to a second viewpoint, updating the texture atlas to include the second shading information for the first subset and the elements of the first shading information for the second subset, and sending the updated texture atlas to the client device. The updated texture atlas is configured for rendering images of the visible portions of the objects from multiple viewpoints.

17 Claims, 12 Drawing Sheets

(56) References Cited

U.S. PATENT DOCUMENTS

| | | |
|---|---|---|
| 2014/0267248 A1 | 9/2014 | Zou et al. |
| 2015/0269785 A1 | 9/2015 | Bell et al. |
| 2017/0227765 A1 | 8/2017 | Mammou et al. |
| 2019/0066370 A1 | 2/2019 | Schmalstieg et al. |
| 2019/0098278 A1 | 3/2019 | Koizumi |
| 2019/0347845 A1* | 11/2019 | Makar ................ G06T 15/80 |
| 2020/0020150 A1 | 1/2020 | Johansson et al. |
| 2020/0175759 A1 | 6/2020 | Russell et al. |
| 2020/0364926 A1 | 11/2020 | Mueller et al. |
| 2021/0264166 A1 | 8/2021 | Slutsky et al. |
| 2021/0390761 A1 | 12/2021 | Kowalski et al. |
| 2021/0392313 A1 | 12/2021 | Kimura |

OTHER PUBLICATIONS

Carr., et al., "Meshed Atlases for Real-Time Procedural Solid Texturing," ACM Transactions on Graphics, Apr. 2002, vol. 21 (2), 26 pages.

Ernst, "Open Sourcing Seurat: bringing high-fidelity scenes to mobile VR," Google Developers, May 4, 2018, 4 pages.

Goldlucke B., et al., "Real-Time Microfacet Billboarding for Free-Viewpoint Video Rendering," Proceedings 2003 International Conference on Image Processing (Cat. No. 03CH37429), IEEE, Sep. 14, 2003, vol. 3, pp. 713-716.

International Search Report and Written Opinion for International Application No. PCT/US2021/055785 dated Apr. 28, 2022, 9 pages.

Kamburelis M., "Shadow Maps and Projective Texturing in X3D," 15th International Conference on Web 3D Technology, Jul. 24, 2010, pp. 17-26.

Mildenhall B., et al., "NeRF: Representing Scenes as Neural Radiance Fields for View Synthesis," European Conference on Computer Vision (ECCV), Aug. 3, 2020, 25 pages.

Mueller., et al., "Shading Atlas Streaming," ACM Transactions on Graphics, Article 199, Nov. 2018, vol. 37 (6), 16 pages.

Zhou T., et al., "Stereo Magnification: Learning View Synthesis using Multiplane Images," ACM Transactions Graph, Aug. 2018, vol. 37 (4), Article 65, pp. 65:1-65:12.

International Search Report and Written Opinion for International Application No. PCT/US2022/012691, dated Jun. 7, 2022, 10 pages.

International Search Report and Written Opinion for International Application No. PCT/US2022/022217 dated Jul. 15, 2022, 11 pages.

Mayer A.J., "Virtual Texturing," Retrieved from Internet: https://www.cg.tuwien.ac.at/research/publications/2010/Mayer-2010-VT/Mayer-2010-VT-Thesis.pdf, Oct. 14, 2010, 113 pages.

Mildenhall B., et al., "Local Light Field Fusion: Practical View Synthesis with Prescriptive Sampling Guidelines," ACM Transactions on Graphics (TOG), Jul. 12, 2019, vol. 38 (4), pp. 1-14.

Mittring M., et al., "Advanced Virtual Texture Topics," SIGGRAPH '08: ACM SIGGRAPH 2008 Games, Aug. 11, 2008, pp. 23-51.

Wang Q., et al., "IBRNet: Learning Multi-View Image-Based Rendering," Arxiv.Org, Cornell University Library, Feb. 25, 2021, pp. 4690-4699.

Yu A., et al., "pixelNeRF: Neural Radiance Fields from One or Few Images," arXiv, 2020, 20 pages, https://arxiv.org/abs/2012.02190.

* cited by examiner

ADAPTIVE RATE SHADING USING TEXTURE ATLAS

PRIORITY

This application claims the benefit, under 35 U.S.C. § 119(e), of U.S. Provisional Patent Application No. 63/124,576, filed 11 Dec. 2020, which is incorporated herein by reference.

TECHNICAL FIELD

This disclosure generally relates to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

This application relates to systems and methods for reducing the computational burden of real-time graphics rendering by eliminating the need to perform a shading operation on every object, or portion thereof, separately for each video frame in which it is visible, resulting in smoother videos and reduced power consumption. The method determines which objects that are visible in a scene, or portions thereof, should be re-shaded for a current frame and which can be rendered using shading results from a previous frame.

In particular embodiments, the method may include a server generating first shading information for visible portions of objects relative to a first viewpoint, storing the first shading information in a texture atlas, and sending the texture atlas to a client device, such as a headset or a head-mounted display or a controller for a headset, a head-mounted display, or another display device. The method may also include determining a first subset of the visible portions of the objects for which shading information is to be re-generated and a second subset for which elements of the first shading information are to be reused, generating second shading information for the first subset relative to a second viewpoint, updating the texture atlas to include the second shading information for the first subset and the elements of the first shading information for the second subset, and sending the updated texture atlas to the client device. The updated texture atlas may be configured for rendering images of the visible portions of the objects from multiple viewpoints at the client device.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
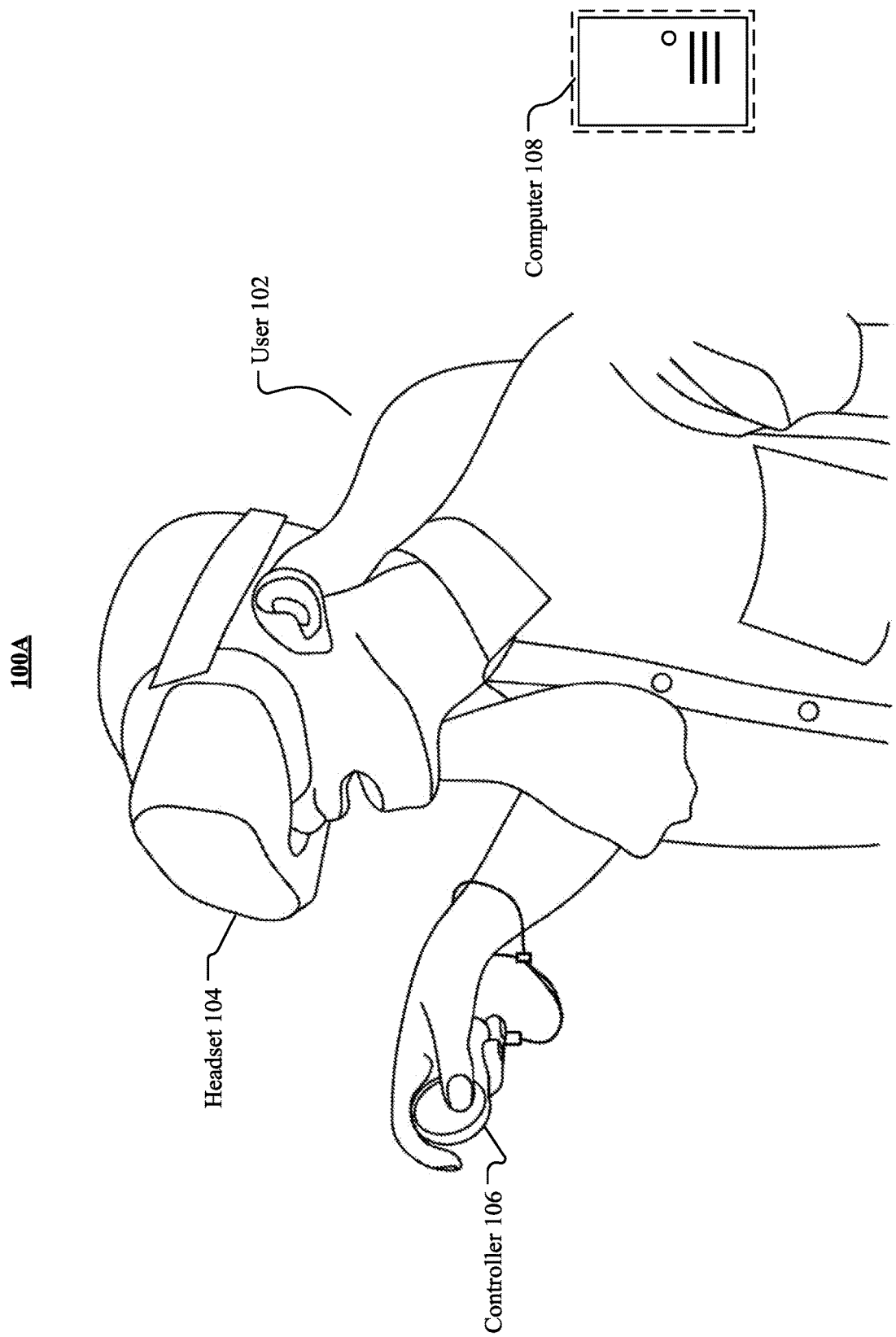
FIG. 1A illustrates an example artificial reality system.

Described herein are systems and methods for reducing the computational burden of real-time graphics rendering by eliminating the need to perform a shading operation on every object separately for each video frame in which it is visible, resulting in smoother videos and reduced power consumption. The method includes determining which visible objects, or portions thereof, should be re-shaded for a current frame and which can be rendered using shading results from a previous frame.

Typically, when rendering each frame, a rendering engine has to perform visibility tests against various objects in the scene, sample their corresponding textures, and render the final pixels based on the current lighting conditions and the user's viewpoint. This final operation, commonly referred to as shading, is computationally expensive. Instead of repeating the shading process for every frame, the methods described in this application use previously rendered pixels to generate a large texture atlas for all the visible portion of objects, which is then used for construction of the current view. In particular embodiments, the texture atlas may contain shaded RGBA information associated with the visible triangles for each object mesh. Unlike the original textures that only include the material properties of the visible portions of the objects without factoring in the current lighting and viewpoint information, the texture atlas encodes the final perceived image because it includes the final pixels that were rendered in the previous frame. In particular embodiments, the atlas may be double-buffered such that it stores both the final shading result for the previous frame and the shading performed for the current frame. Any re-shading for the current frame may be performed on the atlas data, rather than in the image space for the frame.

In particular embodiments, the determination of which visible portions of objects, or triangles thereof, should be shaded, or re-shaded, for the current frame may be dependent on the geometry of the scene. For example, an index of triangles visible in the current frame may be compared to an index of visible triangles saved for the previous frame to determine a list of newly visible triangles to be shaded for the current frame. In particular embodiments, the determination of which visible portions of the objects in the scene, or particular triangles thereof, should be re-shaded for the current frame, and/or the rate at which various visible portions of the objects or triangles thereof should be re-shaded, may also be dependent on the materials of the visible portions of the objects. For example, the shading of a wooden object in the scene may be less susceptible to view changes than the shading of a reflective metal object. Such view-independent objects may be re-shaded less often than the view-dependent objects. The results of these determinations, i.e., a list of triangles recommended for shading or re-shading, may be provided to the rendering application for re-shading, and the application may reuse the shading of other triangles retrieved from the atlas. In some cases, the application, such as a game, may override the recommendation based on application context. For example, if the application knows that significant changes to the scene will occur in the next frame or across multiple upcoming frames, the application may determine that more visible portions of objects, or triangles thereof, should be re-shaded than those recommended.

In particular embodiments, there may be separate atlases, or separate portions of an atlas, for view-independent objects and for view-dependent objects. For example, one atlas (or portion thereof) may be used to determine and store the shading results for diffuse components of the video frame and another atlas (or portion thereof) may be used to determine and store the shading results for specular components of the video frame, potentially at different rates. In another example, since specularities may vary widely based on view location, the system may maintain a separate atlas (or separate atlas portion) that is used to determine and store the shading results for specular components of the video frame for each eye in addition to maintaining a third atlas (or atlas portion) that is used to determine and store the shading results for diffuse components of the video frame. The two results may then be linearly combined to generate the final product. In particular embodiments, the rendering engine may use machine learning or optical flow analysis to detect, at a lower frame rate, which portions of the objects tend to appear the same and which tend to differ significantly based on the view angle. This information may be used to guide whether particular visible portions of the objects should be rendered and re-shaded at higher or lower frame rates.

FIG. 1A illustrates an example artificial reality system 100A. In particular embodiments, the artificial reality system 100 may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 206 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
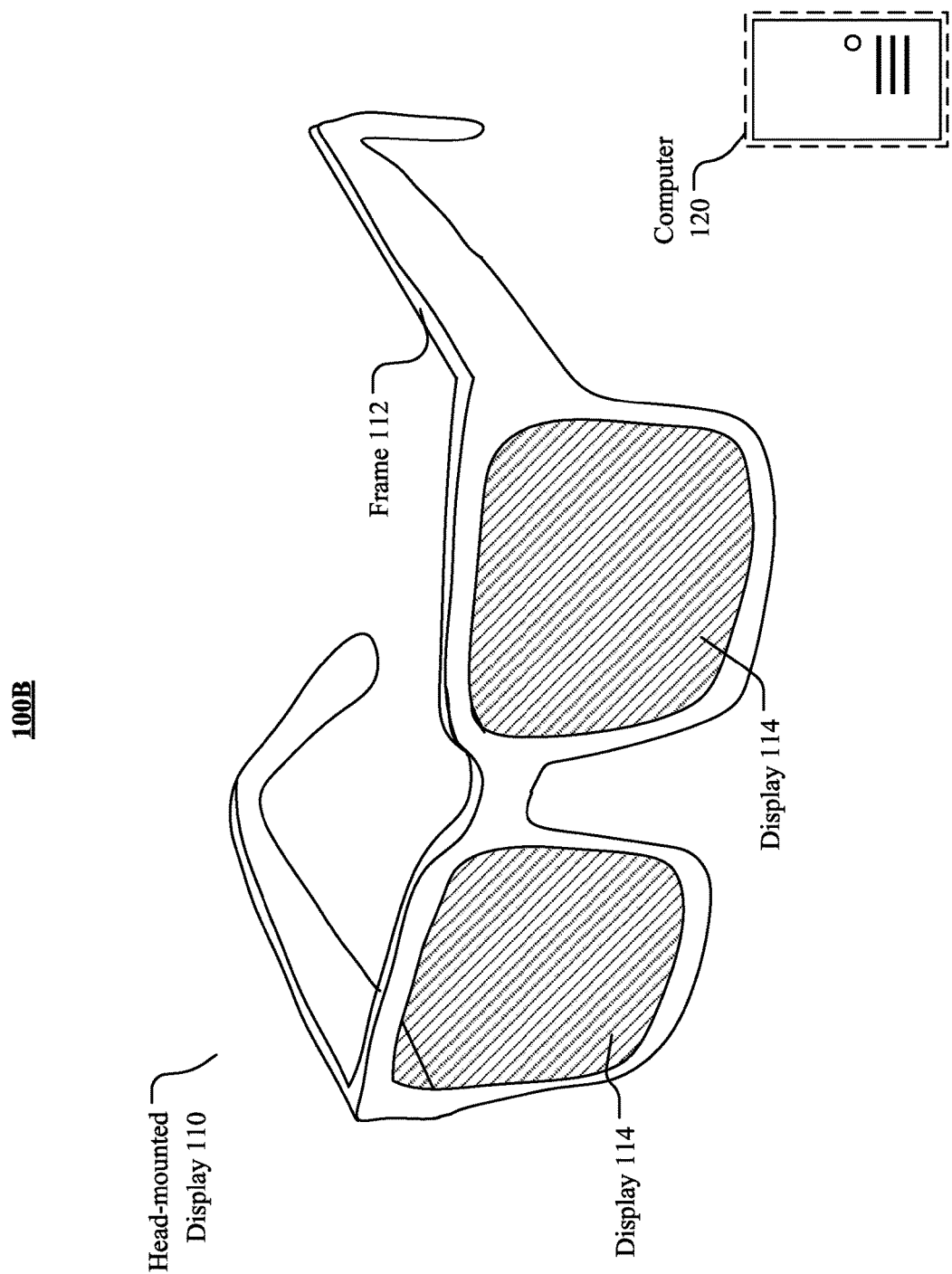
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 1C:
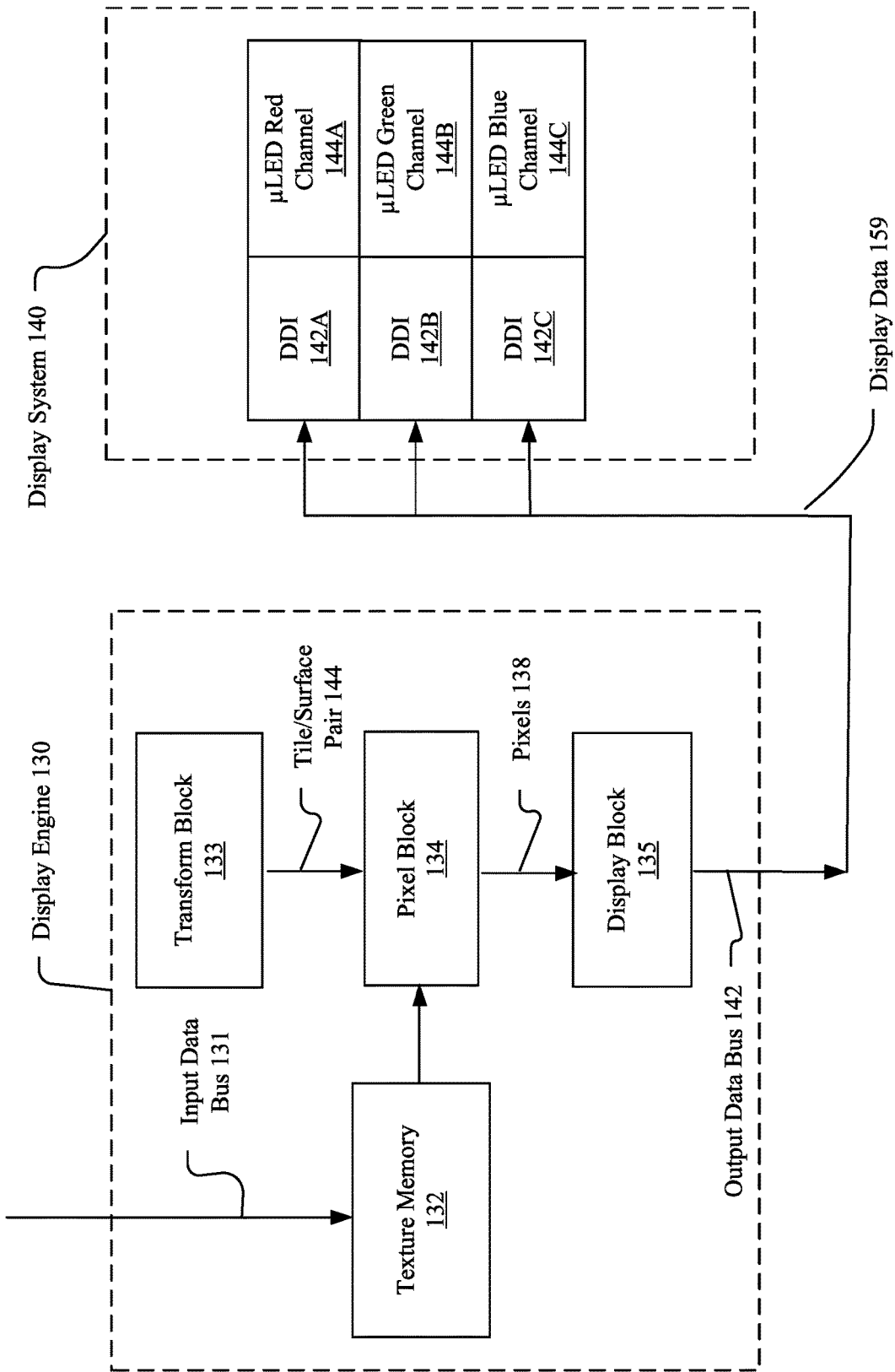
FIG. 1C illustrates an example architecture of a display engine.

FIG. 1C illustrates an example architecture 100C of a display engine 130. In particular embodiments, the processes and methods as described in this disclosure may be embodied or implemented within a display engine 130 (e.g., in the display block 135). The display engine 130 may include, for example, but is not limited to, a texture memory 132, a transform block 133, a pixel block 134, a display block 135, input data bus 131, output data bus 142, etc. In particular embodiments, the display engine 130 may include one or more graphic pipelines for generating images to be rendered on the display. For example, the display engine may use the graphic pipeline(s) to generate a series of subframe images based on a mainframe image and a viewpoint or view angle of the user as measured by one or more eye tracking sensors. The mainframe image may be generated or/and loaded into the system at a mainframe rate of 30-90 Hz and the subframe rate may be generated at a subframe rate of 1-2 kHz. In particular embodiments, the display engine 130 may include two graphic pipelines for the user's left and right eyes. One of the graphic pipelines may include or may be implemented on the texture memory 132, the transform block 133, the pixel block 134, the display block 135, etc. The display engine 130 may include another set of transform block, pixel block, and display block for the other graphic pipeline. The graphic pipeline(s) may be controlled by a controller or control block (not shown) of the display engine 130. In particular embodiments, the texture memory 132 may be included within the control block or may be a memory unit external to the control block but local to the display engine 130. One or more of the components of the display engine 130 may be configured to communicate via a high-speed bus, shared memory, or any other suitable methods. This communication may include transmission of data as well as control signals, interrupts or/and other instructions. For example, the texture memory 132 may be configured to receive image data through the input data bus 211. As another example, the display block 135 may send the pixel values to the display system 140 through the output data bus 142. In particular embodiments, the display system 140 may include three color channels (e.g., 114A, 114B, 114C) with respective display driver ICs (DDIs) of 142A, 142B, and 143B. In particular embodiments, the display system 140 may include, for example, but is not limited to, light-emitting diode (LED) displays, organic light-emitting diode (OLED) displays, active matrix organic light-emitting diode (AMLED) displays, liquid crystal display (LCD), micro light-emitting diode (ILED) display, electroluminescent displays (ELDs), or any suitable displays. In particular embodiments, texture memory 132 may include one or more texture atlases, as described herein. In other embodiments, one or more texture atlases may be implemented in another portion of display engine 130.

In particular embodiments, the display engine 130 may include a controller block (not shown). The control block may receive data and control packages such as position data and surface information from controllers external to the display engine 130 though one or more data buses. For example, the control block may receive input stream data from a body wearable computing system. The input data stream may include a series of mainframe images generated at a mainframe rate of 30-90 Hz. The input stream data including the mainframe images may be converted to the required format and stored into the texture memory 132. In particular embodiments, the control block may receive input from the body wearable computing system and initialize the graphic pipelines in the display engine to prepare and finalize the image data for rendering on the display. The data and control packets may include information related to, for example, one or more surfaces including texel data, position data, and additional rendering instructions. The control block may distribute data as needed to one or more other blocks of the display engine 130. The control block may initiate the graphic pipelines for processing one or more frames to be displayed. In particular embodiments, the graphic pipelines for the two eye display systems may each include a control block or share the same control block.

In particular embodiments, the transform block 133 may determine initial visibility information for surfaces to be displayed in the artificial reality scene. In general, the transform block 133 may cast rays from pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye tracking sensors, and/or any suitable tracking/localization algorithms, such as simultaneous localization and mapping (SLAM)) into the artificial scene where surfaces are positioned and may produce tile/surface pairs 144 to send to the pixel block 134. In particular embodiments, the transform block 133 may include a four-stage pipeline as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the eye display systems the headset system. The transform block 133 may determine whether each ray bundle intersects with surfaces in the scene by comparing a bounding box of each tile to bounding boxes for the surfaces. If a ray bundle does not intersect with an object, it may be discarded. After the tile-surface intersections are detected, the corresponding tile/surface pairs may be passed to the pixel block 134.

In particular embodiments, the pixel block 134 may determine color values or grayscale values for the pixels based on the tile-surface pairs. The color values for each pixel may be sampled from the texel data of surfaces received and stored in texture memory 132. The pixel block 134 may receive tile-surface pairs from the transform block 133 and may schedule bilinear filtering using one or more filer blocks. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation). In particular embodiments, the pixel block 134 may process the red, green, and blue color components separately for each pixel. In particular embodiments, the display may include two pixel blocks for the two eye display systems. The two pixel blocks of the two eye display systems may work independently and in parallel with each other. The pixel block 134 may then output its color determinations (e.g., pixels 138) to the display block 135. In particular embodiments, the pixel block 134 may composite two or more surfaces into one surface to when the two or more surfaces have overlapping areas. A composed surface may need less computational resources (e.g., computational units, memory, power, etc.) for the resampling process.

In particular embodiments, the display block 135 may receive pixel color values from the pixel block 134, covert the format of the data to be more suitable for the scanline output of the display, apply one or more brightness corrections to the pixel color values, and prepare the pixel color values for output to the display. In particular embodiments, the display block 135 may each include a row buffer and may process and store the pixel data received from the pixel block 134. The pixel data may be organized in quads (e.g., 2×2 pixels per quad) and tiles (e.g., 16×16 pixels per tile). The display block 135 may convert tile-order pixel color values generated by the pixel block 134 into scanline or row-order data, which may be required by the physical displays. The brightness corrections may include any required brightness correction, gamma mapping, and dithering. The display block 135 may output the corrected pixel color values directly to the driver of the physical display (e.g., pupil display) or may output the pixel values to a block external to the display engine 130 in a variety of formats. For example, the eye display systems of the headset system may include additional hardware or software to further customize backend color processing, to support a wider interface to the display, or to optimize display speed or fidelity.

In particular embodiments, the dithering methods and processes (e.g., spatial dithering method, temporal dithering methods, and spatiotemporal methods) as described in this disclosure may be embodied or implemented in the display block 135 of the display engine 130. In particular embodiments, the display block 135 may include a model-based dithering algorithm or a dithering model for each color channel and send the dithered results of the respective color channels to the respective display driver ICs (DDIs) (e.g., 142A, 142B, 142C) of display system 140. In particular embodiments, before sending the pixel values to the respective display driver ICs (e.g., 142A, 142B, 142C), the display block 135 may further include one or more algorithms for correcting, for example, pixel non-uniformity, LED non-ideality, waveguide non-uniformity, display defects (e.g., dead pixels), etc.

In particular embodiments, graphics applications (e.g., games, maps, content-providing apps, etc.) may build a scene graph, which is used together with a given view position and point in time to generate primitives to render on a GPU or display engine. The scene graph may define the logical and/or spatial relationship between the visible portions of the objects in the scene. In particular embodiments, the display engine 130 may also generate and store a scene graph that is a simplified form of the full application scene graph. The simplified scene graph may be used to specify the logical and/or spatial relationships between surfaces (e.g., the primitives rendered by the display engine 130, such as quadrilaterals or contours, defined in 3D space, that have corresponding textures generated based on the mainframe rendered by the application). Storing a scene graph allows the display engine 130 to render the scene to multiple display frames and to adjust each element in the scene graph for the current viewpoint (e.g., head position), the current object positions (e.g., they could be moving relative to each other) and other factors that change per display frame. In addition, based on the scene graph, the display engine 130 may also adjust for the geometric and color distortion introduced by the display subsystem and then composite the visible portions of the objects together to generate a frame. Storing a scene graph allows the display engine 130 to approximate the result of doing a full render at the desired high frame rate, while actually running the GPU or display engine 130 at a significantly lower rate.

Figure 1D:
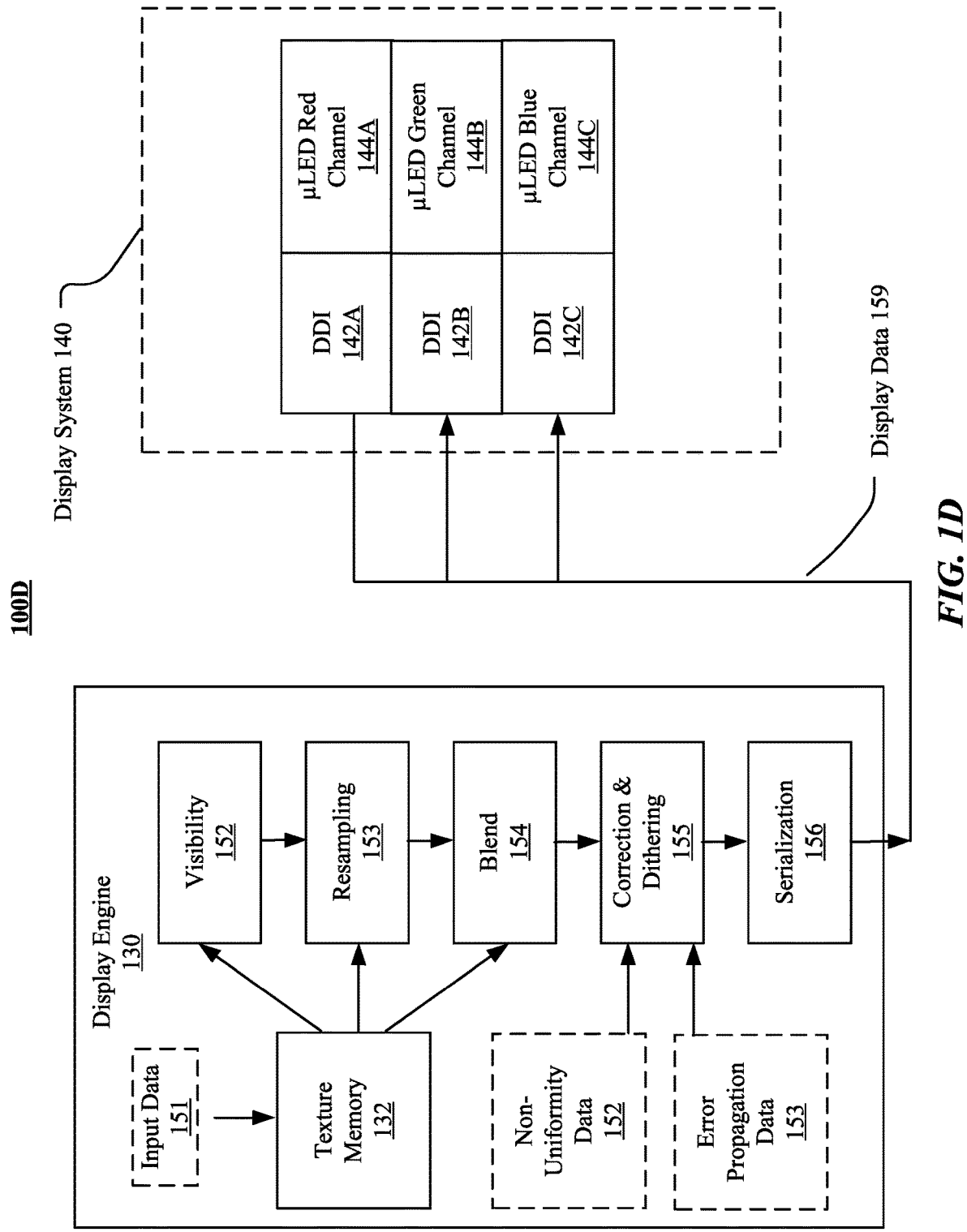
FIG. 1D illustrates an example graphic pipeline of the display engine for generating display image data.

FIG. 1D illustrates an example graphic pipeline 100D of the display engine 130 for generating display image data. In particular embodiments, the graphic pipeline 100D may include a visibility step 152, where the display engine 130 may determine the visibility of one or more surfaces received from the body wearable computing system. The visibility step 152 may be performed by the transform block (e.g., 2133 in FIG. 1C) of the display engine 130. The display engine 130 may receive (e.g., by a control block or a controller) input data 151 from the body-wearable computing system. The input data 151 may include one or more surfaces, texel data, position data, RGB data, and rendering instructions from the body wearable computing system. The input data 151 may include mainframe images with 30-90 frames per second (FPS). The main frame image may have color depth of, for example, 24 bits per pixel. The display engine 130 may process and save the received input data 151 in the texel memory 132. The received data may be passed to the transform block 133 which may determine the visibility information for surfaces to be displayed. The transform block 133 may cast rays for pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye trackers, and/or any suitable tracking/localization algorithms, such as simultaneous localization and mapping (SLAM)) into the artificial scene where surfaces are positioned and produce surface-tile pairs to send to the pixel block 134.

In particular embodiments, the graphic pipeline 100D may include a resampling step 153, where the display engine 130 may determine the color values from the tile-surfaces pairs to produce pixel color values. The resampling step 153 may be performed by the pixel block 134 in FIG. 1C) of the display engine 130. The pixel block 134 may receive tile-surface pairs from the transform block 133 and may schedule bilinear filtering. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation) and output the determined pixel values to the respective display block 135.

In particular embodiments, the graphic pipeline 100D may include a bend step 154, a correction and dithering step 155, a serialization step 156, etc. In particular embodiments, the bend step, correction and dithering step, and serialization steps of 154, 155, and 156 may be performed by the display block (e.g., 135 in FIG. 1C) of the display engine 130. The display engine 130 may blend the display content for display content rendering, apply one or more brightness corrections to the pixel color values and perform one or more dithering algorithms for dithering the quantization errors (based, in part and in particular embodiments, on non-uniformity data 157 and/or error propagation data 158) both spatially and temporally, serialize the pixel values for scanline output for the physical display, and generate the display data 159 suitable for the display system 140. The display engine 130 may send the display data 159 to the display system 140. In particular embodiments, the display system 140 may include three display driver ICs (e.g., 142A, 142B, 142C) for the pixels of the three color channels of RGB (e.g., 144A, 144B, 144C).

Typically, when rendering each frame using a traditional approach, a rendering engine has to perform visibility tests against various portions of objects in the scene, sample their corresponding textures, and render the final pixels based on the current lighting conditions and the user's viewpoint. As described in detail herein, systems and methods for performing adaptive rate shading using a texture atlas may reduce the computational burden of real-time graphics rendering, which translates to smoother videos and reduced power consumption by recognizing that some visible objects, or portions thereof, might not need to be re-shaded for each individual frame in which they appear, but can be rendered using shading results generated for a previous frame. Instead of repeating those same steps for every frame, the disclosed systems take shortcuts by reusing the pixels rendered in the previous frame to generate the current frame. Specifically, these systems use the previously rendered pixels to generate a large texture atlas for all the visible portions of the objects.

In one example, if objects A, B, and C were visible in a previous scene, each of the objects has its own texture. Instead of rendering the current frame from scratch, the systems described herein may use the pixels of the previous frame to generate a large texture atlas for all three objects. Unlike the original textures, which only include the material properties of the visible portions of the objects without factoring in the current lighting and viewpoint information, the large texture atlas may encode the final perceived product because it includes the final pixels that were rendered in the previous frame. Since the scene could have changed (due, e.g., to changes in the visible portions of the objects and/or the user's viewpoint), the systems described herein may adaptively decide which portions of the current scene need to be re-rendered using the traditional approach and update the atlas accordingly. These systems may attempt to make use of as much valid pixel information as possible, so that the application need only re-shade pixels that are coming into existence in the current frame or for which more detail is needed in the current frame (e.g. if any object comes closer to the viewer). In particular embodiments, the texture atlas may be implemented in texture memory, such as texture memory 132 illustrated in FIGS. 1C and 1D. In other embodiments, one or more texture atlases may be implemented in another portion of display engine 130.

In an approach referred to as Adaptive Rate Shading (ARS), a rendering engine may look at screen-space differences between the previous frame and the current frame and provide a recommendation to the upstream application about what should be re-rendered. Using this approach, the application would render a scene and then a separate process performed subsequent to the application rendering the scene would take the rendered image and re-project the contents of that image using a number of methods, such as depth re-projection or motion vector re-projection similar to those used with time warping or asynchronous space warping (ASW). Following the re-projection, the application may analyze how well it was able to re-project the content and based on that analysis, may create a confidence mask of the results indicating the areas in which confidence in the results is high and the areas in which confidence in the results was low. For example, the confidence may be low for a disocclusion area that started peeking behind an object as the viewpoint is moving around and additional visible objects, or portions thereof, are uncovered. The confidence mask may then be sent back to the application so that, instead of re-rendering the whole frame, the application may selectively decide to use the confidence mask to render smaller portions of the screen.

The ARS approach described above may rely on a virtual reality (VR) application and a virtual reality (VR) compositor. The VR application may render an initial frame including color and depth information as outputs and may submit the initial color and depth information to the VR compositor. The VR compositor may re-project the color and depth information as well as ASW to detect movement of content across the screen. In particular embodiments, the VR application may run at the native refresh rate and the VR compositor may be initiated immediately afterward to figure out what is needed and provide it back to the VR application before the VR application begins rendering the next frame. In other embodiments, the VR application may render at a lower rate than the native refresh rate while ARS re-projection handles the major visuals. The re-projection may composite the results into a historical frame buffer that is close to being ready to view on the client device (e.g., a headset, a head-mounted display, or another display device). The VR compositor may mark areas that need to be re-rendered by the VR application using a "tiled coverage map" called "adaptive refresh map." This may include disocclusion areas (due to various reasons), or areas for which confidence about the re-projection quality is lower (e.g., due to one or more objects, or visible portions thereof, moving closer. In particular embodiments, marking "confidence" may include applying machine learning to recognize which results look good and which do not.

The VR application may use the "tiled coverage map" provided by the VR compositor to initialize a Variable Rate Shading (VRS) map. In some cases, the VR application may perform its own analysis to further modify the VRS map based on changes of which the VR compositor is not aware, such as a camera cut, a new object appearing in the scene, or a highly dynamic area that might need additional detail, such as particle effects. The VR application may then render the scene using the VRS map. The expectation is that this VRS map on average may throw away the majority of the pixels in the frame, significantly improving performance. Some VRS tiles may be culled outright, while others may only be reduced significantly in resolution.

The systems and methods for performing adaptive rate shading using a texture atlas described herein may build on some of the concepts of ARS. However, while ARS is designed for reusing shading information from a previous shading in camera-view space (or screen space), systems that implement adaptive rate atlas shading (ARAS) may be configured to re-use previous frame shading information in atlas space. In particular embodiments, the texture atlas may contain shading information for the triangles that are visible in the current rendering pass (e.g., relative to a particular viewpoint or range of viewpoints), at least some of which may be reused in a subsequent rendering pass (e.g., relative to different viewpoint or range of viewpoints). In particular embodiments, because GPUs typically know how to deal with triangles at a native level, the information in the texture atlas may be associated with the visible triangles for each object mesh represented in the current scene. With adaptive rate atlas shading, instead of rendering images as is (e.g., in the image space), the shading operations (and, in some embodiments, the lighting operations) may be performed in the texture atlas. With adaptive rate atlas shading, instead of blindly re-shading every single triangle in the atlas every frame, the system may adaptively decide which areas need to be re-lighted and/or re-shaded, potentially breaking down the lighting and shading operations into separate lighting and shading components.

In particular embodiments, shading may be relatively view-independent for an object that, regardless of the viewpoint from which a user looks at its surface, the shading may remain significantly similar unless the light source itself is changing drastically. However, shading may be highly view-dependent for an object with a shiny surface. For example, the shading of a wooden object in a scene may be less susceptible to view changes than the shading of a reflective metal object, which may be expected to change as the viewpoint moves through the scene. Object meshes for objects that include both view-independent portions and view-dependent portions, such as objects composed of mixed materials, may be broken down into subsets of triangles that are view-independent and other subsets of triangles that are view-dependent and these subsets of triangles may be treated differently from each other in terms of shading and re-shading.

In traditional rendering, for every frame at whatever the frame rate is, there is a particular perspective from which the scene is viewed (i.e., a viewpoint) whether the frame is viewed in an AR/VR context or on a standard monitor, and that frame is constructed piece-by-piece by computing the shading results that are needed for each of the visible pixels in that frame. In contrast, when incorporating a texture atlas into the rendering process, as in the adaptive rate atlas shading approaches described herein, the system may, for a given region, find all of the object surfaces that could be visible from a particular viewpoint (or viewing angle), or from multiple viewpoints (or viewing angles) within a range of viewpoints near the particular viewpoint, and the system may compute the shading results for all of the visible surfaces and store them in a texture atlas for potential reuse in any of the viewpoints within the range of viewpoints. The rendering process may, when presenting the scene from another one of the viewpoints within the range of viewpoints, collect the shading results that were pre-computed and stored in the atlas and apply them, where appropriate, into the final result. In particular embodiments, this may be performed as a two-stage process in real time in which, in the first stage, shading results are computed and stored in the atlas, and in the second stage, only the subsets of those results suitable for reuse may be fetched from the atlas.

Figure 5:
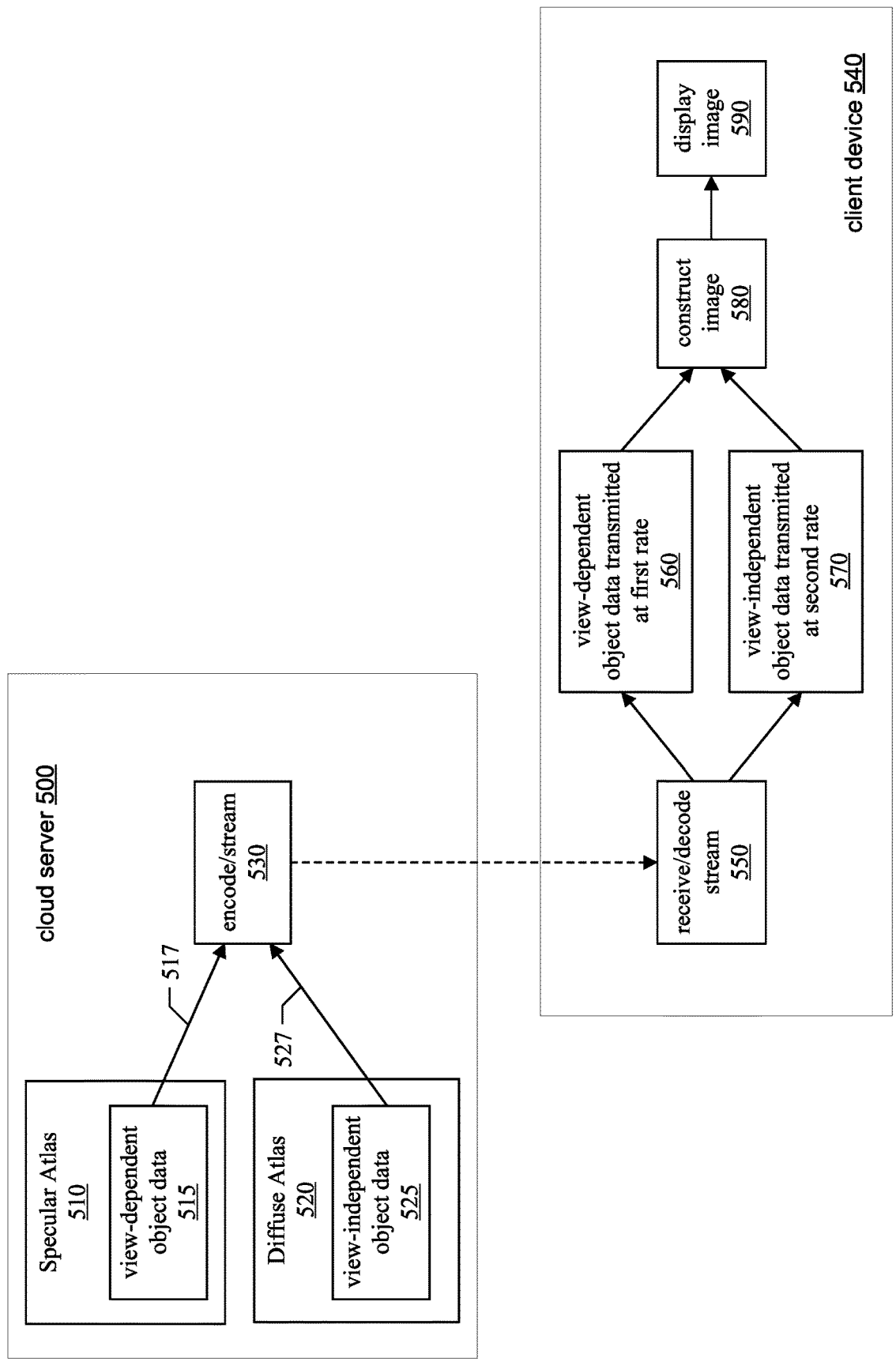
FIG. 5 illustrates an example pipeline architecture for performing adaptive rate shading using a texture atlas.

In particular embodiments, a server, such as computing system 108 illustrated in FIG. 1A, computer 120 illustrated in FIG. 1B, or cloud server 500 illustrated in FIG. 5, may maintain a 3D model of a virtual environment that contains virtual objects. Periodically, the server may receive the latest viewpoint from a client device, such as a headset or a head-mounted display or a controller for a headset, a head-mounted display, or another display device. Based on that viewpoint information, the server may determine which triangles of which object meshes are visible (or potentially visible) to a user from the latest viewpoint and may generate the corresponding shading information. The atlas generated based on that viewpoint (e.g., at a time t0) and sent to a client device on which the virtual environment is to be displayed, may be used by the client device to render n number of frames before an updated atlas is sent to the client device (e.g., at a time t1). In this example, the server may send a stream of atlases to the client device and the client device may render and output a stream of video frames. However, the ratio of the frame rates for the two streams is not necessarily 1-to-1. For example, for every 10 atlases sent, the client device might render 100 frames. In particular embodiments, there may be little delay between computing shading information for a particular frame and updating and providing an updated atlas to the client device and/or to the application on whose behalf the frames are rendered. For example, the system may determine, almost immediately from what the application rendered, for which triangles the shading information can be reused and, again almost immediately, feed that information back to the application so that it can be reused in the next frame that the application is about to render.

Figure 2:
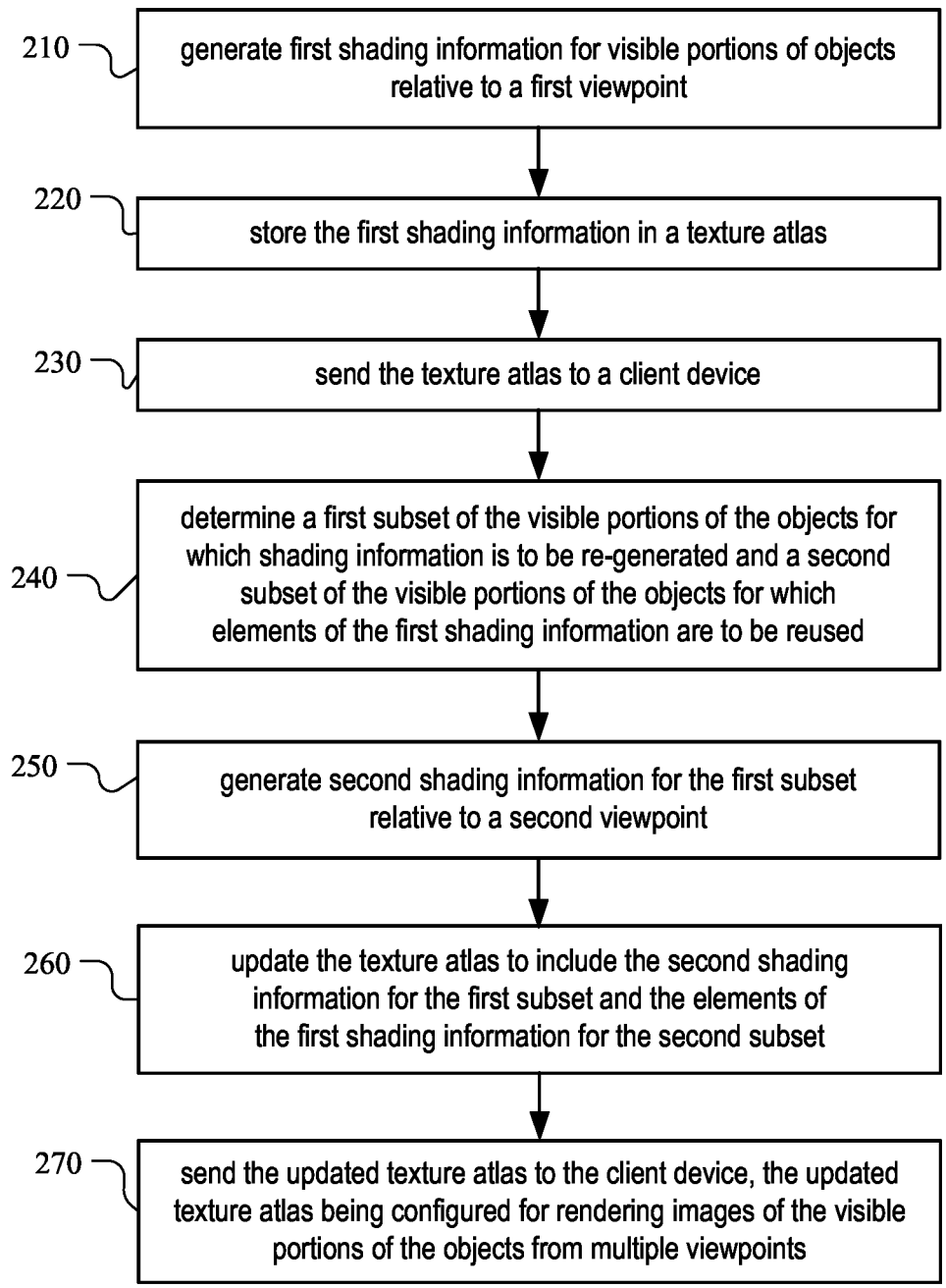
FIG. 2 illustrates an example method for performing adaptive rate shading using a texture atlas.

FIG. 2 illustrates an example method 200 for performing adaptive rate shading using a texture atlas. In particular embodiments, some or all of the operations of method 200 may be performed by a server, such as computing system 108 illustrated in FIG. 1A, computer 120 illustrated in FIG. 1B, or cloud server 500 illustrated in FIG. 5. The method may begin at step 210, with generating first shading information for visible portions of objects relative to a first viewpoint.

At step 220, method 200 may include storing the first shading information in a texture atlas. In particular embodiments, there might not be a single data structure that stores shading information for every single triangle in the whole application. Instead, each object mesh may contain its own primitive indices, which may be double-buffered, and each individual mesh may determine and maintain information about its own visibility. However, in particular embodiments, when an initial depth map is generated for the application, the system may render every object mesh into that initial depth map, resulting in an initial depth map that creates a good occlusion mask for the subsequent meshes to be rendered into. In particular embodiments, the GPU may handle depth testing automatically to create the initial depth map and/or any subsequently created depth maps.

In particular embodiments, the texture atlas may include an index of triangles, each representing a visible portion of one of the visible objects and identified in the index of triangles by a respective primitive ID, and the index of triangles may indicate which of the triangles are visible relative to a given viewpoint. In particular embodiments, instead of rendering a lighted and shaded version of the scene to create a depth map of the scene, the system may first render a lower resolution version to generate the depth map. Subsequently, the individual object mesh parts may be rendered on top of this depth map, and the system may determine which triangles include pixels that would be visible in the frame. The texture atlas may include shading information only for those triangles that include visible pixels and might not include any shading information for triangles for which no pixels are visible in the scene. In particular embodiments, for each triangle in the index of triangles, a Boolean flag may be used to indicate whether or not the triangle is visible. In particular embodiments, a frame index number associated with each triangle in the index of triangles may be used to indicate the most recent frame in which each triangle was visible. For example, if the current frame is frame 19 and the information in the index of triangles indicates that a particular triangle visible in frame 19 was also visible on frame 18, the frame index for the particular triangle may be updated to indicate that it continued to be visible in frame 19. In this case, the particular triangle might or might not need to be re-shaded for frame 19, rather than being shaded using the shading information from frame 18, depending on whether its shading is view-dependent or view-independent and/or other factors. However, if the information in the index of triangles indicates that a second triangle visible in frame 19 was most recently visible in frame 17 (or another frame prior to frame 18), this may indicate that the second triangle was reintroduced into the scene at frame 19. In this case, there would be no shading information for the second triangle stored in the atlas and the second triangle would be marked as needing re-shading for frame 19.

At step 230, method 300 may include sending the texture atlas to a client device, such as a headset or a head-mounted display or a controller for a headset, a head-mounted display, or another display device. At step 240, subsequent to sending the texture atlas, the method may include determining a first subset of the visible portions of the objects for which shading information is to be re-generated and a second subset of the visible portions of the objects for which elements of the first shading information are to be reused. As described in more detail below, in particular embodiments, determining the first subset and the second subset may be dependent on one of more of: a lighting of one of the visible objects, or a portion thereof, a difference between the first viewpoint and the second viewpoint, a relative geometry of two or more of the visible objects, or respective portions thereof, an animation of one or more visible objects, or a material of one of the visible objects, or a portion thereof. For example, in particular embodiments, the first subset may include visible portions of objects for which shading is view-dependent and the second subset may include visible portions of objects for which shading is view-independent.

In particular embodiments, determining the first subset and the second subset may include generating an indication of the triangles for which shading information is to be generated based at least on the index of triangles in the texture atlas. In particular embodiments, rather than comparing the triangles of the visible surfaces themselves to those in the previous frame, the system may determine visibility based on the frame index for each triangle in the index of triangles. In particular embodiments, a new depth map may be rendered a low resolution for the current frame and, rather than relying on the previous spatial locations of the triangles or the previous depth map, a new list of primitive IDs corresponding to triangles visible against the new depth map may be generated and compared against a list of primitive IDs corresponding to triangles visible in the previous frame.

In particular embodiments, determining the first subset and the second subset may include using a machine learning model to predict which of the visible portions of the objects are likely to appear differently relative to the second viewpoint than they appeared relative to the first viewpoint. For example, machine learning may be applied to learn that, over time, the shading of particular object surfaces (or triangles thereof) changes relatively slowly, if at all, and that the shading of other object surfaces (or triangles thereof) changes relatively quickly, which may influence the partitioning of the visible portions of the object into the first and second subsets. In particular embodiments, a form of Fourier analysis may be applied to look at the frequency and/or the pixel density of shading changes for particular objects, or visible portions thereof, and to provide hints about how frequently they are likely to need re-shading. For example, a very glossy surface on which reflections are extremely large and have very low resolution, such as a brushed metal surface, might not need to be updated as often as, for example, a mirror surface, even though they are both very reflective surfaces.

At step 250, method 200 may include generating second shading information for the first subset relative to a second viewpoint. For example, instead of re-shading every triangle, the system may shade only the triangles for which there has been an indication that they need to be re-shaded. In particular embodiments, generating the indications may include creating a new mesh on the fly for the affected object or marking triangles as visible and not visible and letting the GPU automatically handle them. In other embodiments, the indications may be in the form of masks, stencils, selective checks, look-up tables, or in any other form suitable for conveying the information back to the application in a way that is relatively simple to process.

At step 260, the method may include updating the texture atlas to include the second shading information for the first subset and the elements of the first shading information for the second subset. In particular embodiments, the texture atlas may be double buffered. For example, rather than immediately updating the shading information in the atlas in place, the atlas may, at any given time, store shading information for the current frame being rendered and for the immediately preceding frame. This approach supports a process in which new shading information is written to the texture atlas while the previously written shading information is still being used for rendering and/or for performing comparisons with the new shading information. In particular embodiments, updating the texture atlas may include storing, in the texture atlas, a compressed version of the second shading information and compressed versions of the elements of the first shading information. In particular embodiments, updating the texture atlas may include storing the second shading information with which the first subset was shaded in the texture atlas and storing the second subset of the visible portions of the objects in the texture atlas as first image data shaded using the elements of the first shading information.

At step 270, method 200 may include sending the updated texture atlas to the client device. The updated texture atlas may be configured for rendering images of the visible portions of the objects from multiple viewpoints.

Particular embodiments may repeat one or more steps of the method of FIG. 2 where appropriate. For example, method 200 may further include determining, subsequent to sending the updated texture atlas, a third subset of the visible portions of the objects for which shading information is to be generated and a fourth subset of the visible portions of the objects for which elements of the shading information in the updated texture atlas are to be reused, generating third shading information for the third subset relative to a third viewpoint, further updating the texture atlas to include the third shading information for the third subset and the elements of the shading information in the updated texture atlas for the fourth subset, and sending the further updated texture atlas to the client device, the further updated texture atlas being configured for rendering images of the visible portions of the objects from multiple viewpoints and so on, for additional viewpoints.

Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates example methods for performing adaptive rate shading using a texture atlas, including the particular steps of the method of FIG. 2, this disclosure contemplates any suitable method for performing adaptive rate shading using a texture atlas including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3A:
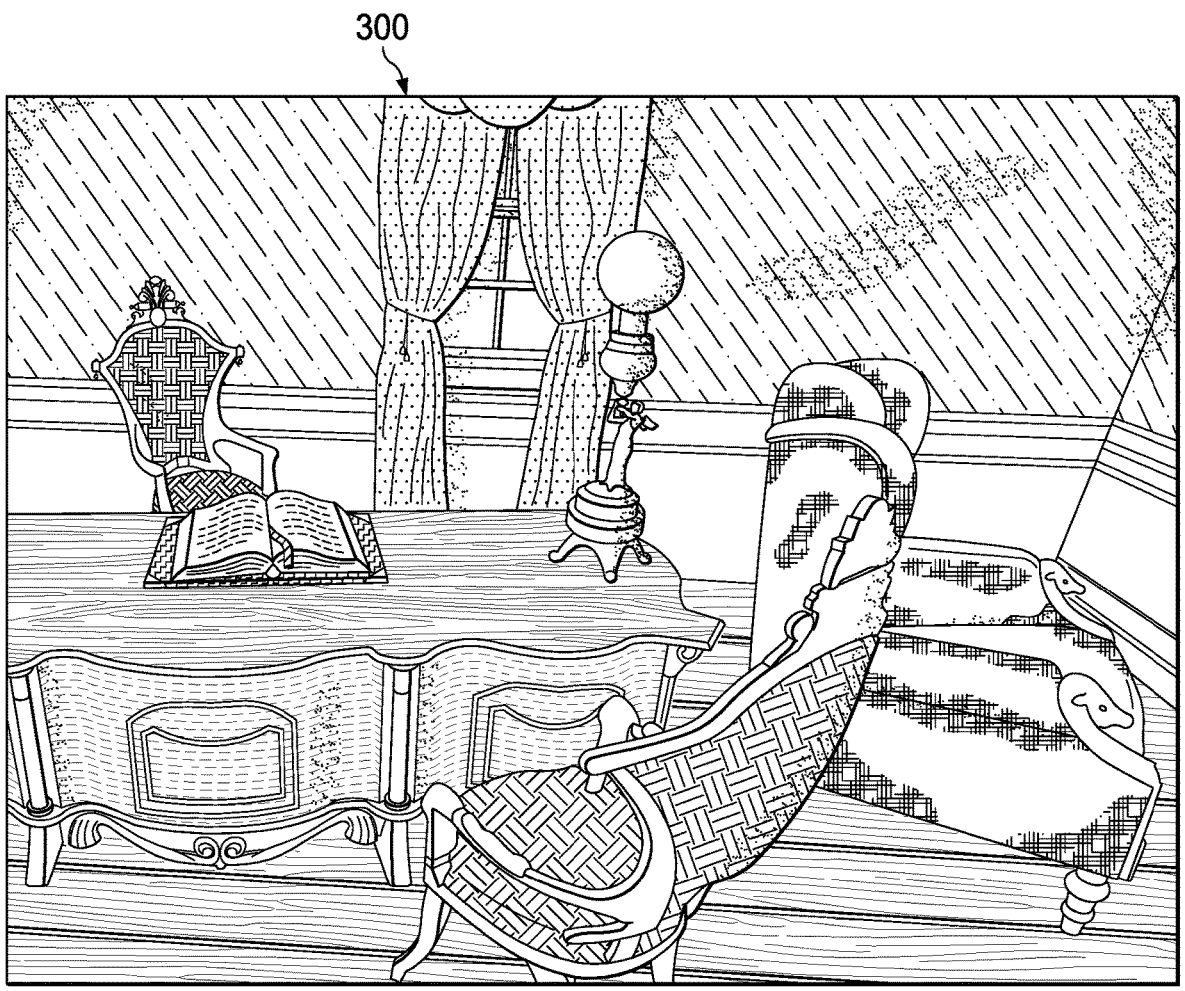
FIGS. 3A and 3B illustrate an example rendered scene and a portion of an example texture atlas describing the scene, respectively.
Figure 3B:
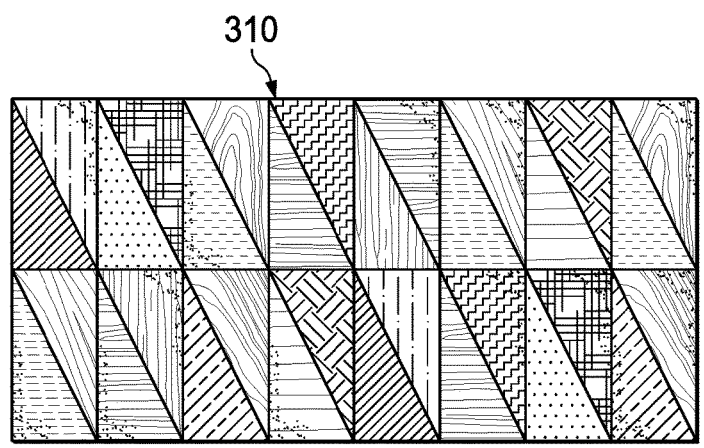

FIGS. 3A and 3B illustrate an example rendered scene 300 and a portion 310 of an example texture atlas describing the scene, respectively. In this example, all of the lighting and shading information computed for the rendered scene 300 is built into the texture information stored in the texture atlas.

In particular embodiments, the use of a texture atlas with adaptive rate shading may allow the lighting and shading operations to be performed irrespective of the final frame rate while the rendering engine continues to provide low-latency, judder free visuals, especially in AR/VR applications. As described herein, the atlas may contain shading information for the triangles that are visible in the current view laid out in a large texture to be used for reconstruction of the 3D view. Some of the triangles laid out in the atlas may come and go as the corresponding objects, or visible portions thereof, enter and exit the frame, but the majority of them may persist in a subsequent frame except in the case of major frame cuts. Similarly, the majority of the lighting and shading information on persistent triangles may include similar lighting and shading information. The atlas may provide a convenient mechanism for using the geometry for subsequent re-projection which is often utilized in VR for lowering latency for HMD tracking. However, that benefit is orthogonal to the improvements gained by being able to re-project lighting and shading for the scene rendering. At first glance, the expectation for the atlas would be to use the same triangles used for rendering the geometry. However, large triangles falling only partially into the frame would either have to be tessellated, or partially shaded where the atlas texels that are visible by the camera are processed by the lighting and shading pipeline.

Once the previous buffered atlas stores the end shading result for the last frame, the task is to determine which triangles need to be re-shaded in the next frame. There are multiple factors that contribute to the need, or desire, to re-shade certain triangles a particular frame, examples of which are described below.

One factor that contributes to a determination about which triangles to re-shade and which triangles to reuse is geometry, e.g., the relative geometries of two or more of the visible objects, or respective portions thereof. For example, in particular embodiments, a list of triangles that were visible in the previous frame is saved. For the current frame, depending on changes to the user's viewpoint and object changes, a new list of triangles that are visible may be estimated. The list may be compared with the previous list to determine what needs to be re-rendered. That list may also serve as a recommendation for the up-stream application to decide whether to only re-shade those triangles. If so, the shading results may be saved in the texture atlas for consumption. In particular embodiments, the texture atlas generated for a main frame may be used to render several subframes at different viewpoints. When the relative positions of two or more visible objects, or portions thereof, change, this might also trigger a re-shading of one or more of the objects, or portions thereof. Similarly, even if a particular object is stationary, there might be another object affecting its shading, such as by casting a shadow onto the surface of the stationary object that might trigger an update. For example, portions of the stationary object may need to be re-shaded if the silhouette or edge of the shadow moves across the surface of the stationary object to make sure the shadow appears to be moving across the surface relatively smoothly. However, if the stationary object is completely in shadow or completely not in shadow, there would be no need for re-shading.

Another factor that may contribute to a determination about which triangles to re-shade and which triangles to reuse is an animation of one or more of the visible objects. In particular embodiments, if the scene includes an animated character, and even if the albedo of the texture might be the same with respect to different viewpoints, at least some of the triangles on the surface of the character may need to be re-shaded based on the movement of the character itself. For example, if the character's head rotates around, it may catch different lighting and shading. In particular embodiments, it may be determined that the shading for any animated object should be updated at a higher rate than for a stationary object.

Yet another factor that may contribute to a determination about which triangles to re-shade and which triangles to reuse is the material of which a virtual object is made. For example, some materials are more affected by viewpoint changes than others (e.g., metal versus wood). In particular embodiments, the rendering engine may use machine learning or optical flow to detect, at a relatively low frame rate, which visible portions of the objects tend to appear the same and which tend to differ significantly when viewed from different positions or view angles. Such information may be used to guide whether something needs to be rendered at a higher or lower frame rate (e.g., if the shading of a wooden table shading does not change very much, nor very often, those triangles may not need to be re-shaded as often as triangles for a metal table).

In particular embodiments, the systems described herein may include separate atlases for view-dependent vs. view-independent shading. For example, one atlas could track non-specular shading and another atlas could track specular shading. The information from the two atlases could then be linearly added together to generate the final shaded image. In particular embodiments, there may be separate atlases for view-dependent shading for each eye, for a total of three active atlases.

In particular embodiments, an application on whose behalf frames are rendered may override a determination about which triangles should be re-shaded and which shading information should be reused. For example, if the application knows that there is some significant change in the application context for the scene (e.g., an explosion), the application may determine that the whole scene, or a larger portion of the scene than was recommended, should be re-rendered and re-shaded, rather than using the recommended re-shading list. In this example, the application would still have full access to the source meshes and full access to the contents of the atlas that it would need to render as much of the scene as desired. In another example, the application may override the recommended re-shading list in response to detecting a motion in the application that will affect the shading of one or more visible portions of the objects or triangles that were not recommended for re-shading. In particular embodiments, a motion vector may be generated from the contents of the texture as it is being rendered and, based on the magnitude of the motion vector (e.g., if the magnitude is above or below a predetermined threshold), the shading of the affected portion of the scene maybe updated at a higher or lower rate. For example, if the magnitude of the motion vector is very small, any change in shading may be imperceptible. However, if the magnitude of the motion vector is very large, the affected portion of the scene may be re-shaded at a much higher rate, such as at the native frame rate or refresh rate of the application.

In particular embodiments, if the atlas contents are updated at a lower rate compared to the display rate, vertex animation may be inherently reflected in the atlas vertex data to smooth out motion. In particular embodiments, the majority of the color deduced from shading on a given triangle may come from view-independent shading that is mostly related to the radiosity light-maps, diffuse lighting and albedo of the surface. For static scenery, a triangle's world-space position will remain static, which means that the color information of the surface will change relatively slowly for surfaces that are not as reflective (meaning any view-dependent shading is relatively small). In particular embodiments, except for overdraw effects, transparencies would be sorted as usual since they will have their own triangles in the texture atlas. In particular embodiments, optical flow may be used to make sure shading on the surface that results from temporal or view dependent shading changes are captured in a manner similar to how they are handled in ASW. In particular embodiments, shadows moving across a surface may move smoothly regardless of the screen space positioning of the triangle except in cases where the triangle's visibility toggles on/off.

In particular embodiments, there is overhead in laying out the atlas and in determining visibility as well as persistency. However, in many cases the savings from pixel shading may outweigh the cost of the additional atlas logistics. In particular embodiments, the triangles shaded for the atlas may be rasterized in projection space during a separate pass similar to distortion composition. This may affect performance but may be relatively inexpensive since it is a "diffuse texture" with a triangle mesh. In particular embodiments, screen-space special effects such as depth of field (DOF), screen-space ambient occlusion (SSAO), or bloom, may have to be done after the atlas is rendered in projection space. In particular embodiments, anti-aliasing such as temporal anti-aliasing (TAA), subpixel morphological anti-aliasing (SMAA), fast approximate anti-aliasing (FXAA) or multi-sample anti-aliasing (MSAA) may have to be applied after or during the projection space rendering using the atlas information. In particular embodiments, if the scene is not tessellated well enough, the number of atlas texels being shaded may potentially exceed the number of pixels on the display. However, the number of texels being shaded would be reduced by the culling mask used for adaptive rate atlas shading.

While in several of the examples described herein, the texels for which shading information is stored in the texture atlas for potential reuse are triangles, in other embodiments, the texels for which shading information can be stored in the texture atlas may include quads, ray tracing elements, constructive solid geometry (CSG) style surface descriptions, tessellated surfaces or other analytical surfaces, or any other type of virtual object primitive. In still other embodiments, a texture atlas may store more granular information, e.g., finer resolution information, such as masks for where the edges or boundaries of shadows are moving or for where more detailed information is available, to lay over the triangle to indicate not simply that the triangle needs to be re-shaded, but that just this particular portion of the triangle needs to be re-shaded.

Figure 4:
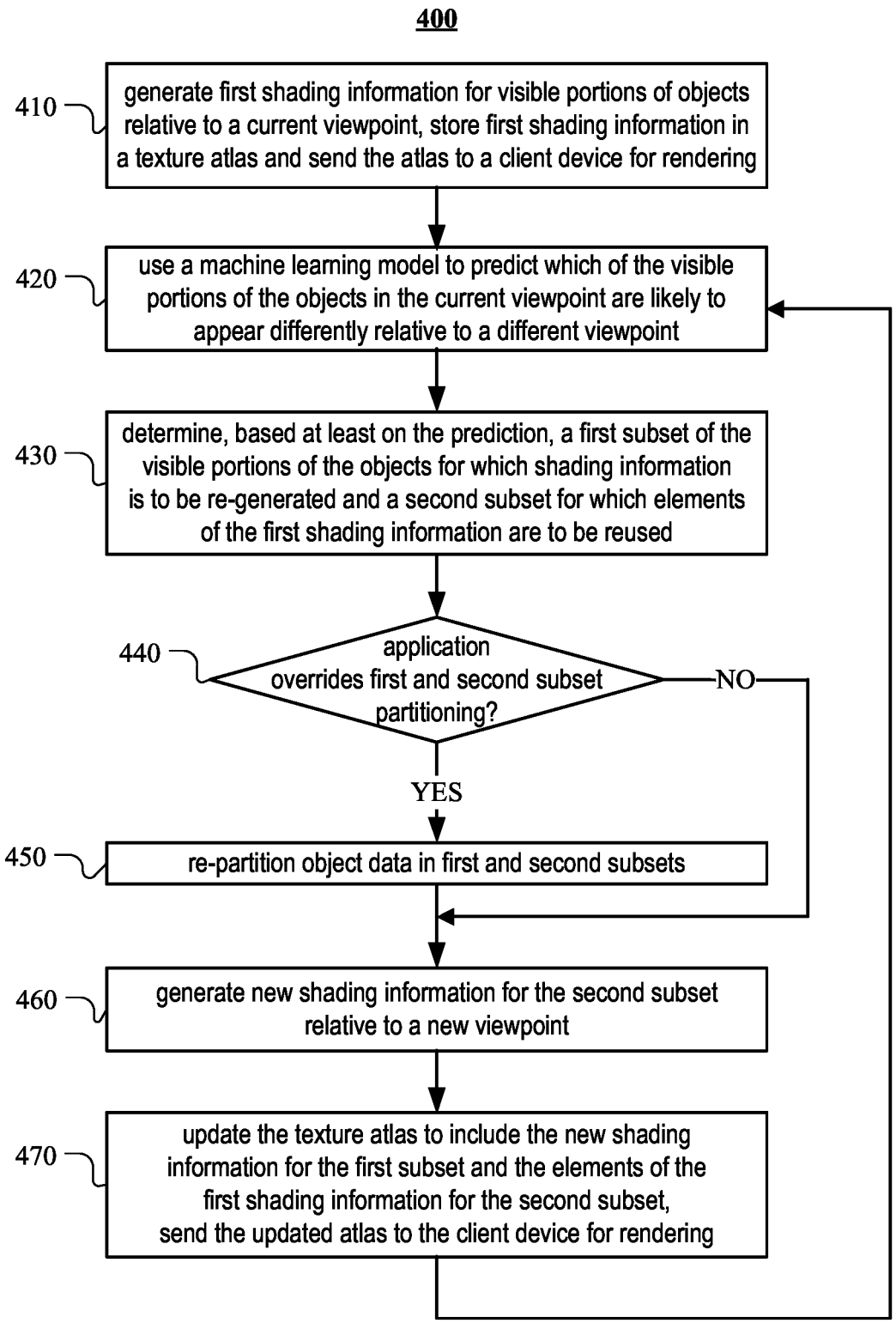
FIG. 4 illustrates an example method for performing adaptive rate shading using a texture atlas and machine learning.

FIG. 4 illustrates an example method 400 for performing adaptive rate shading using a texture atlas and machine learning. In particular embodiments, some or all of the operations of method 400 may be performed by a server, such as computing system 108 illustrated in FIG. 1A, computer 120 illustrated in FIG. 1B, or cloud server 500 illustrated in FIG. 5. The method may begin at step 410, where the server generates first shading information for visible portions of objects relative to a current viewpoint, stores the first shading information in a texture atlas, and sends the atlas to a client device, such as a headset or a head-mounted display or a controller for a headset, a head-mounted display, or another display device, for rendering.

At step 420, method 400 may include use a machine learning model to predict which of the visible portions of the objects in the current viewpoint are likely to appear differently relative to a different viewpoint. In other embodiments, a different type of analysis, such as a Fourier analysis, may provide hints about which of the visible portions of the objects are likely to need frequent re-shading, as described herein.

At step 430, the method may include determining, based at least on the prediction, a first subset of the visible portions of the objects for which shading information is to be re-generated and a second subset for which elements of the first shading information are to be reused. As described herein, the determination of the first and second subsets may be based on one or more other factors including, for example, geometry, material, animation, and lighting changes, among others.

If, at step 440, the application for which the texture atlas was generated overrides the determination of the first and second subset partitioning, method 400 may continue at 450. Otherwise, the method may proceed to 460. For example, the application may override the determination based on an application context or on a motion detected in the application, among other factors. At step 450, the method may include re-partitioning object data in the first and second subsets in accordance with the particular reason for the overriding.

At step 460, method 400 may include generating new shading information for the second subset relative to a new viewpoint, e.g., a viewpoint that is not within the range of viewpoints for which previously generated shading information is valid.

At step 470, the method may include updating the texture atlas to include the new shading information for the first subset and the elements of the first shading information for the second subset and sending the updated atlas to the client device for rendering. In particular embodiments, updating the texture atlas may include storing, in the texture atlas, a compressed version of the new shading information and a compressed version of the elements of the first shading information. In particular embodiments, updating the texture atlas may include storing the second shading information with which the first subset was shaded in the texture atlas and storing the second subset of the visible portions of the objects in the texture atlas as first image data shaded using the elements of the first shading information.

Particular embodiments may repeat one or more steps of the method of FIG. 4, where appropriate. For example, as shown in FIG. 4, steps 420 through 470 may be repeated continuously during execution of the application as frames associated with new viewpoints are rendered and the texture atlas is updated. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates example methods for performing adaptive rate shading using a texture atlas and machine learning, including the particular steps of the method of FIG. 4, this disclosure contemplates any suitable method for performing adaptive rate shading using a texture atlas and machine learning including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

In particular embodiments, to deliver higher fidelity VR experiences on mobile devices having limited compute capability, the compute-intensive operations involved in image rendering may be moved to a cloud ecosystem in which the computationally expensive calculations are performed by a high performance server that renders the virtual content, compresses it, and streams it, usually over a network, to a mobile device. The mobile device may then make any final adjustments that may be needed and displays the image content. One of the main challenges limiting the success of cloud-based rendering, however, is that it introduces additional latency by extending the delay between the time image content is requested by the client and the time the client receives it for display, with latencies greater than 30 ms generally being considered unacceptable. For example, latency in delivering content may arise as the content is compressed, transmitted, and then decompressed.

Existing cloud-based reconstruction and rendering methods typically separately stream: (i) the geometry as a set of potentially visible triangles; and (ii) the necessary shading information encoded as a texture atlas. They may be very effective at real-time rendering for scenes of matte surfaces without specularities. However, they tend to fail when rendering shiny (i.e., specular) surfaces because the specular component of the shading depends strongly on the viewing position. Such view dependence means that proper rendering of scenes containing shiny surfaces requires very frequent updates to the texture atlas, and these updates require a lot of extra bandwidth between the server and client. In many situations, the bandwidth required may exceed that available leading to delays and interruptions in the rendering.

In particular embodiments, the systems described herein may transmit raw atlas data, which may include both the diffuse and specular components intertwined as one. However, the diffuse component may be independent of the viewing position and may need to be updated far less frequently than the specular component. In particular embodiments, the systems described herein for adaptive rate atlas shading may reduce the bandwidth required for sending texture atlas updates encoded as images from a cloud-based server to a client (e.g., a head mounted display or mobile phone) for client-based reconstruction and rendering based at least on separating an input image into its diffuse and specular components and transmitting them separately and at different transmission rates. Generally, the specular component is of low spatial resolution, limited in color range, and changes smoothly with viewing position. These characteristics mean that it can be highly compressed for transmission. As a result, the bandwidth required to update to the specular component is much less than that required to update the diffuse component, and hence it is possible to update the specular component as often as necessary. For example, the highly compressible, dynamic specular component may be transmitted frequently, while the detailed, less compressible, diffuse component may be transmitted infrequently, thereby facilitating real-time rendering of shiny surfaces and other visible portions of objects for which shading is highly view dependent.

In computer graphics, specular and diffuse components are commonly generated independently and then added together prior to display. Although standard computer graphics renderers typically provide a rendering with the specular and diffuse components combined as the final image, such renderers may also provide separate specular and diffuse images. In the context of SAS and similar methods, the advantage of using a texture atlas, S, derived from the specular image, and another atlas, D, derived from the diffuse image, rather than an atlas, A=S+D ("+" meaning matrix addition), based on the standard image, is that D is independent of the view angle. Given a texture atlas D, new views of any triangle represented in the atlas can be rendered from any view position because a diffuse (i.e., Lambertian) surface appears equally bright from all viewing directions. S, on the other hand, depends on the view angle. Rather than applying frequent updates to atlas A, this method keeps atlas D fixed while regularly updating atlas S. In particular embodiments, this approach may dramatically reduce the amount of data to be transmitted.

In particular embodiments, a cloud-based server may render the diffuse and specular image components. Based on the set of currently visible surface elements (e.g., triangles) the diffuse component may be processed into a texture atlas image. The specular component may also be processed into a second texture atlas image or, in other embodiments, may be kept as a specular image. In either case, the image data may be compressed. To maintain image quality, the diffuse data may be compressed at a low compression ratio. The specular data is much less detailed and may be compressed at a much higher compression ratio without affecting the quality of the final result. The encoded diffuse and specular components may be transmitted separately, and at different frequencies, from the server to a client device. Upon receipt, the client device may decode the compressed diffuse component data and construct the appropriate diffuse-component image. Similarly, the client device may receive the specular data, decode it and reconstruct the appropriate specular-component image either from the specular texture atlas or directly as a specular image depending on the encoding used. The specular image may then be added to the diffuse image and displayed. As the client state changes, the client device may reconstruct each new frame it needs based on the most up-to-date specular and diffuse components it has received.

FIG. 5 illustrates an example pipeline architecture for performing adaptive rate shading using a texture atlas. This example pipeline architecture may enable frequent texture atlas updates at low bandwidth, as described above. In the illustrated example, the pipeline includes, on a cloud sever 500, storing view-dependent object data 515 in a specular atlas 510 and storing view-independent object data 525 in a diffuse atlas 520. In other embodiments, view-dependent object data 515 and view-independent object data 525 may be stored together in a single texture atlas or may be stored in respective portions of a single texture atlas. As described in detail herein, the stored object data may be or include shading information for various view-dependent and view-independent objects, or portions thereof. For example, each of specular atlas 510 and diffuse atlas 520 may store an index of triangles, each representing a portion of one of the visible objects, the index of triangles indicating which of the triangles are visible relative to a given viewpoint. In the illustrated example, the pipeline also includes, on the cloud server 500, encoding and streaming data representing the specular atlas 510 and the diffuse atlas 520. This may include, for example compressing the view-dependent object data 515 and the view-independent object data 525 at two different compression ratios, shown as ratios 517 and 527, respectively, where the second compression ratio 527 is lower than the first compression ratio 517. In particular embodiments, updating the texture atlas may include storing compressed shading information.

In the illustrated example, the pipeline includes, on a client device 540, receiving and decoding the streaming data representing the specular atlas 510 and the diffuse atlas 520 to obtain view-dependent object data 560, which may have been transmitted by the cloud server 500 at a first transmission rate 517, and to obtain view-independent object data 570, which may have been transmitted by the cloud server 500 at second transmission rate 527. In various embodiments, client device 540 may be or include a headset or a head-mounted display or a controller for a headset, a head-mounted display, or another display device. The pipeline also includes constructing a single image 580 by combining the view-dependent object data 560 and the view-independent object data 570 and displaying the single image 590, e.g., on a headset, a head-mounted display, or another display device.

In particular embodiments, a rate at which new shading information is generated for the view-dependent objects (or portions thereof) may be higher than a rate at which new shading information is generated for the view-independent objects (or portions thereof).

Figure 6A:
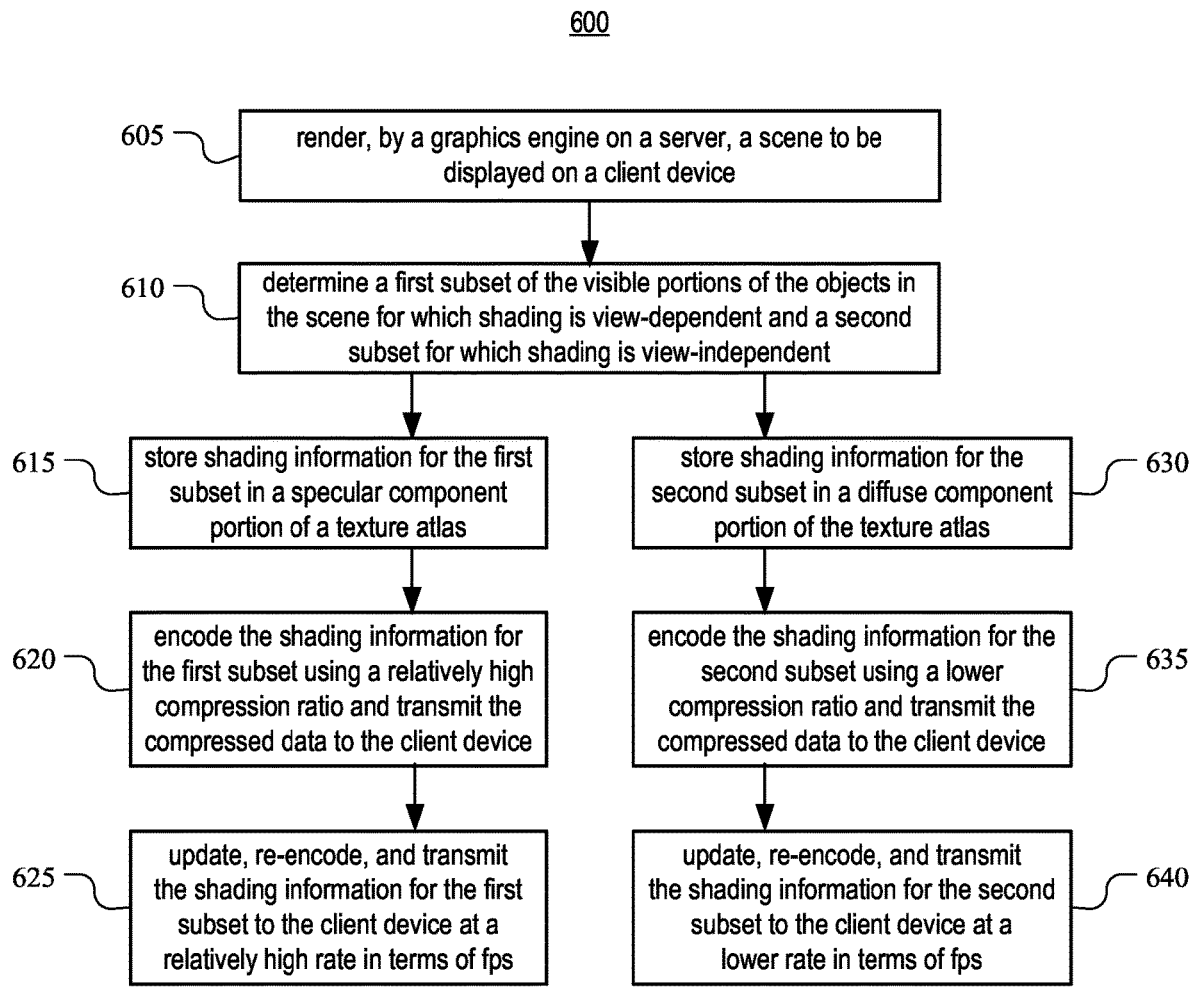
FIG. 6A illustrates an example method for generating and sending shading information to a client device based on a texture atlas.

FIG. 6A illustrates an example method 600 for generating and sending shading information to a client device based on a texture atlas. In particular embodiments, some or all of the operations of method 600 may be performed by a server, such as computing system 108 illustrated in FIG. 1A, computer 120 illustrated in FIG. 1B, or cloud server 500 illustrated in FIG. 5. The method may begin at step 605, with rendering, by a graphics engine on a server, a scene to be displayed at a client device, such as a headset, a head-mounted display, or another display device.

At step 610, method 600 may include determining a first subset of the visible portions of the objects in the scene for which shading is view-dependent and a second subset for which shading is view-independent, using any of the techniques described herein or another suitable technique for partitioning the visible portions of the objects into the first and second subsets.

At step 615, the method may include storing shading information for the first subset in a specular component portion of a texture atlas. At step 620, method 600 may include encoding the shading information for the first subset using a relatively high compression ratio compared to a compression ratio with which the second subset is encoded and transmitting the compressed data to the client device. At step 625, the method may include updating, re-encoding, and transmitting the shading information for the first subset to the client device or to a controller for the client device at a relatively high transmission rate, in terms of fps, compared to a transmission rate at which updated and re-encoded shading information for the second subset is transmitted.

Note that while the operations shown as steps 615, 620, 625 in a left-side branch of method 600 appear in FIG. 6A to be parallel to a right-side branch of method 600 that includes the operations shown as steps 630, 635, and 640, in practices, the operations of the left-side branch may be performed asynchronously with respect to the operations of the right-side branch. For example, the operations involving shading information for view-dependent portions of the visible objects may be performed more frequently than the operations involving shading information for view-independent portions of the visible objects, as described herein.

At step 630, method 600 may include storing shading information for the second subset in a diffuse component portion of the texture atlas. At step 635, the method may include encoding the shading information for the second subset using a compression ratio that is lower than the compression ratio with which the first subset is encoded and transmitting the compressed data to the client device. At step 640, method 600 may include updating, re-encoding, and transmitting the shading information for the second subset to the client device at a lower rate, in terms of fps, than the transmission rate at which updated and re-encoded shading information for the first subset was transmitted.

Particular embodiments may repeat one or more steps of the method of FIG. 6A, where appropriate. For example, step 625 and/or step 640 may be repeated as often as necessary to update the shading information in the specular and diffuse component portions of the texture atlas. Although this disclosure describes and illustrates particular steps of the method of FIG. 6A as occurring in a particular order, this disclosure contemplates any suitable steps of the method of FIG. 6A occurring in any suitable order. Moreover, although this disclosure describes and illustrates example methods for generating and sending shading information to a client device based on a texture atlas, including the particular steps of the method of FIG. 6A, this disclosure contemplates any suitable method for generating and sending shading information to a client device based on a texture atlas including any suitable steps, which may include all, some, or none of the steps of the method of FIG. 6A, where appropriate. Furthermore, although this disclosure describes and illustrates particular components, devices, or systems carrying out particular steps of the method of FIG. 6A, this disclosure contemplates any suitable combination of any suitable components, devices, or systems carrying out any suitable steps of the method of FIG. 6A.

Figure 6B:
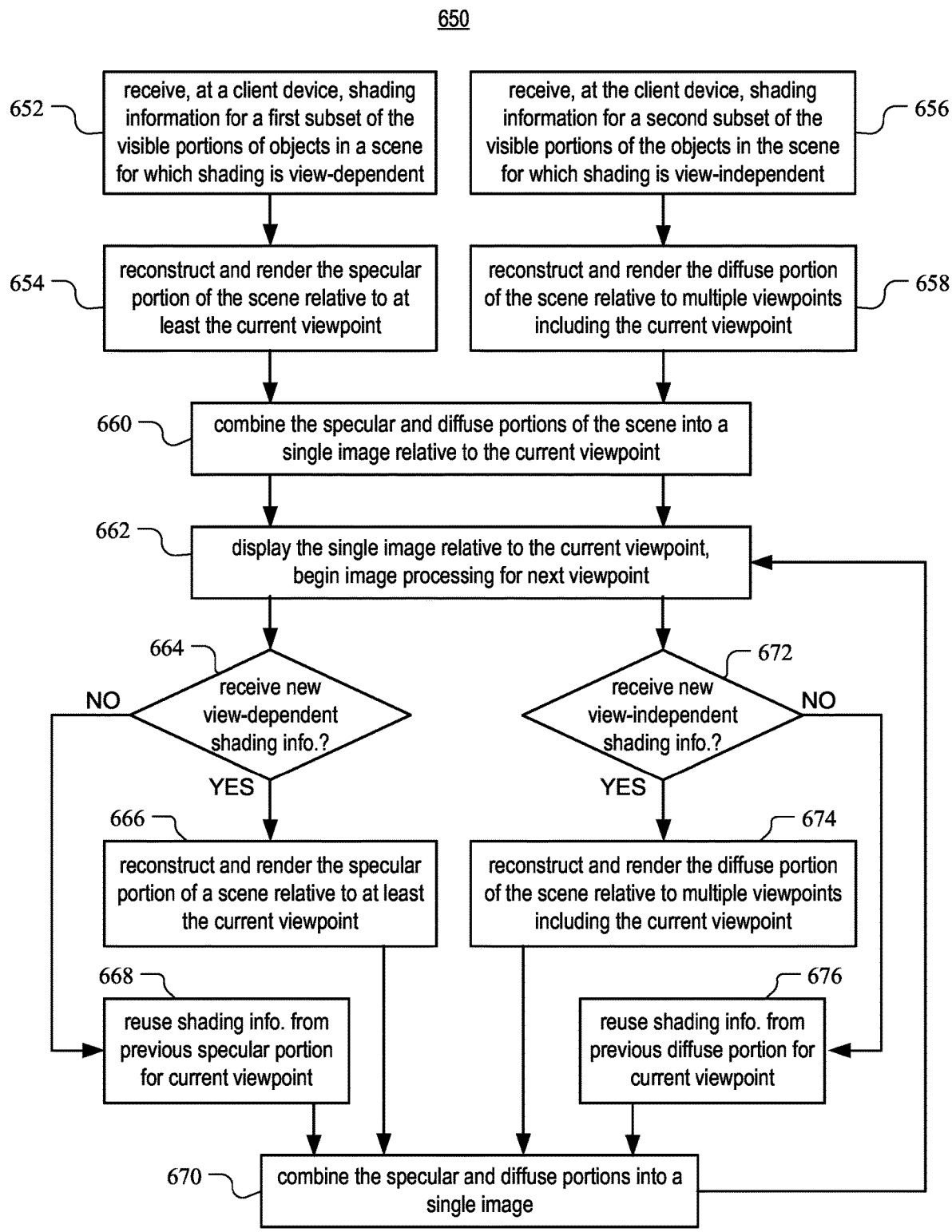
FIG. 6B illustrates an example method for rendering and displaying a scene using shading information generated based on a texture atlas and received from a server.

FIG. 6B illustrates an example method 650 for rendering and displaying a scene using shading information generated based on a texture atlas and received from a server, such as computing system 108 illustrated in FIG. 1A, computer 120 illustrated in FIG. 1B, or cloud server 500 illustrated in FIG. 5. In particular embodiments, some or all of the operations of method 650 may be performed by a client device, such as a headset or a head-mounted display, or a controller for a headset, a head-mounted display, or another display device, as described herein. Note that, similar to FIG. 6A, the operations of the left-side branches of method 650 may be performed asynchronously with respect to the operations of the right-side branches. For example, the operations involving shading information for view-dependent portions of the visible objects may be performed more frequently than the operations involving shading information for view-independent portions of the visible objects, as described herein.

As shown in FIG. 6B, method 650 may begin at step 652, with receiving, at a client device, shading information for a first subset of the visible portions of objects in a scene for which shading is view-dependent. At step 654, method 650 may include reconstructing and rendering the specular portion of the scene relative to at least the current viewpoint.

At step 656, the method may include receiving, at the client device, shading information for a second subset of the visible portions of the objects in the scene for which shading is view-independent. At step 658, method 650 may include reconstructing and rendering the diffuse portion of the scene relative to multiple viewpoints including the current viewpoint.

At step 660, the method may include combining the specular and diffuse portions of the scene into a single image relative to the current viewpoint. At step 662, method 650 may include displaying the single image relative to the current viewpoint and beginning image processing for next viewpoint.

If, at step 664, new view-dependent shading information has been received, method 650 may continue to step 666. Otherwise, the method may proceed to step 668. At step 666, method 650 may include reconstructing and rendering the specular portion of a scene relative to at least the current viewpoint. At step 668, the method may include reusing shading information from the previous specular portion for the current viewpoint.

If, at step 672, new view-independent shading information has been received, method 650 may continue to step 674. Otherwise, the method may proceed to step 676. At step 674, method 650 may include reconstructing and rendering the diffuse portion of the scene relative to multiple viewpoints including the current viewpoint. At step 676, the method may include reusing shading information from the previous diffuse portion for the current viewpoint.

At step 670, method 650 may include combining the specular potion (from step 666 or from step 668, as appropriate) and the diffuse portion (from step 674 or from step 676, as appropriate) into a single image, after which the method returns to step 662 and steps 662 through 670 are repeated for additional viewpoints.

Particular embodiments may repeat one or more steps of the method of FIG. 6B, where appropriate. Although this disclosure describes and illustrates particular steps of the method of FIG. 6B as occurring in a particular order, this disclosure contemplates any suitable steps of the method of FIG. 6B occurring in any suitable order. Moreover, although this disclosure describes and illustrates example methods for rendering and displaying a scene using shading information generated based on a texture atlas and received from a server, including the particular steps of the method of FIG. 6B, this disclosure contemplates any suitable method for rendering and displaying a scene using shading information generated based on a texture atlas and received from a server including any suitable steps, which may include all, some, or none of the steps of the method of FIG. 6B, where appropriate. Furthermore, although this disclosure describes and illustrates particular components, devices, or systems carrying out particular steps of the method of FIG. 6B, this disclosure contemplates any suitable combination of any suitable components, devices, or systems carrying out any suitable steps of the method of FIG. 6B.

In particular embodiments, an artificial neural network may be used to detect, at a relatively low frame rate compared to the native refresh rate, which visible portions of the objects in a scene tend to appear the same and which tend to differ significantly based on the view angle. This information may be used to guide whether particular visible portions of the objects should be rendered and re-shaded at higher or lower frame rates relative to each other. In particular embodiments, an artificial neural network may be used to predict which of the visible portions of the objects in a current viewpoint are likely to appear differently relative to a different viewpoint. For example, machine learning may be applied to learn that, over time, the shading of particular object surfaces (or triangles thereof) changes relatively slowly, if at all, and that the shading of other object surfaces (or triangles thereof) changes relatively quickly, which may influence the partitioning of the visible portions of the object into the first and second subsets. In other embodiments, a different type of analysis, such as a Fourier analysis, may provide hints about which of the visible portions of the objects are likely to need frequent re-shading. marking "confidence" may include applying machine learning to recognize which results look good and which do not. In particular embodiments, a form of Fourier analysis may be applied to look at the frequency and/or the pixel density of shading changes for particular visible portions of the objects and to provide hints about how frequently they are likely to need re-shading.

Figure 7:
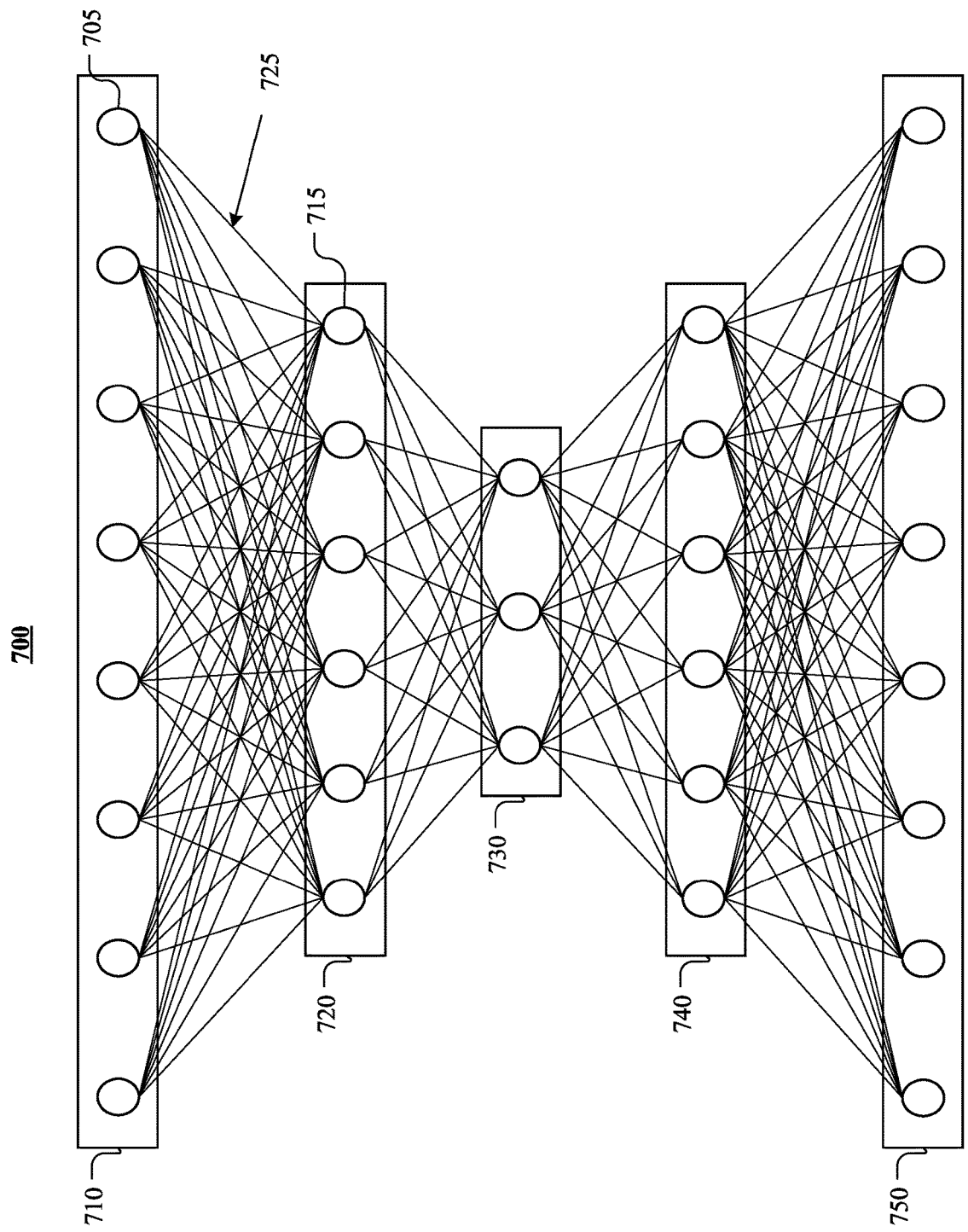
FIG. 7 illustrates an example artificial neural network.

FIG. 7 illustrates an example artificial neural network ("ANN") 700. In particular embodiments, an ANN may refer to a computational model comprising one or more nodes. Example ANN 700 may comprise an input layer 710, hidden layers 720, 730, 740, and an output layer 750. Each layer of the ANN 700 may comprise one or more nodes, such as a node 705 or a node 715. In particular embodiments, each node of an ANN may be connected to another node of the ANN. As an example and not by way of limitation, each node of the input layer 710 may be connected to one of more nodes of the hidden layer 720. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 7 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 7 depicts a connection between each node of the input layer 710 and each node of the hidden layer 720, one or more nodes of the input layer 710 may not be connected to one or more nodes of the hidden layer 720.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 720 may comprise the output of one or more nodes of the input layer 710. As another example and not by way of limitation, the input to each node of the output layer 750 may comprise the output of one or more nodes of the hidden layer 740. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(S_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 725 between the node 705 and the node 715 may have a weighting coefficient of 0.4, which may indicate that 0.4 multiplied by the output of the node 705 is used as an input to the node 715. As another example and not by way of limitation, the output $y_k$ of node k may be $y_k=F_k(s_k)$, where $F_k$ may be the activation function corresponding to node $$k, s_k = \sum_j (w_{jk} x_j)$$

may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 700 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Figure 8:
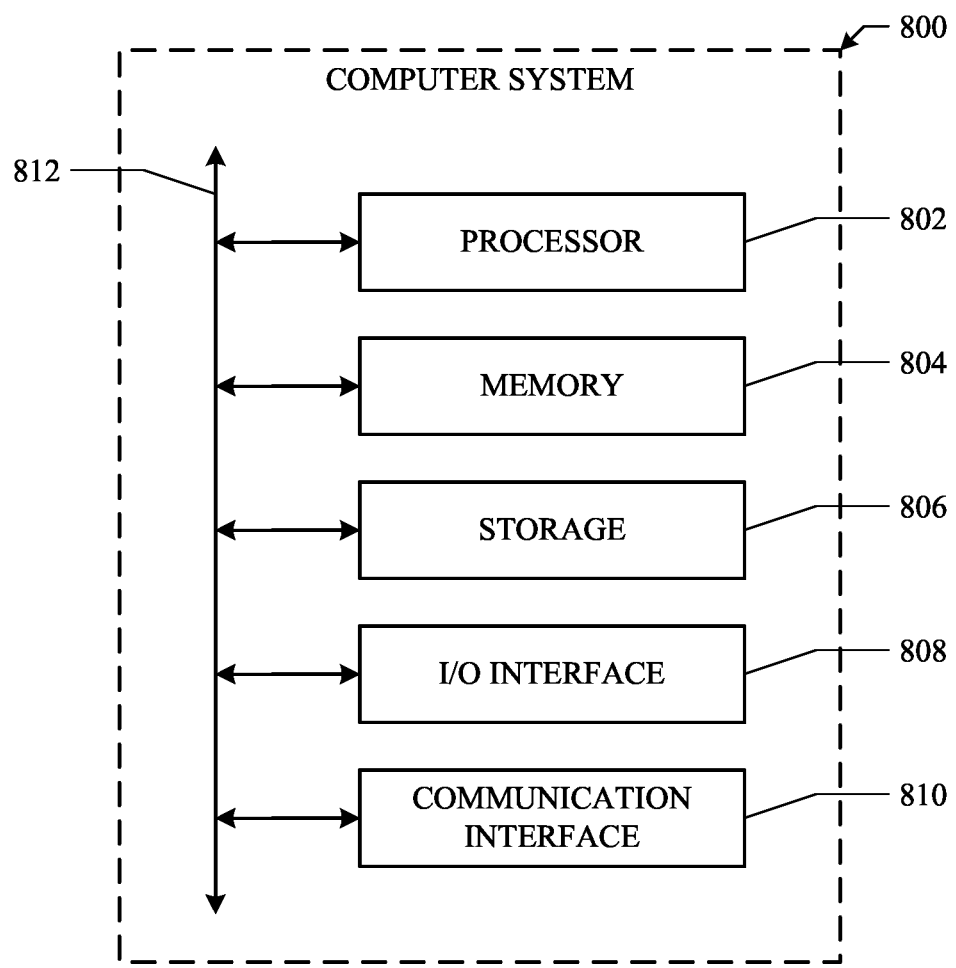
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device (such as, for example, a headset or a head-mounted display) or another type of client device on which video images are rendered and/or displayed, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, a depth sensor, a geolocation sensor, a biometric sensor, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising, by a server:
generating first shading information for visible portions of objects relative to a first viewpoint;
storing, in a texture atlas, the first shading information, wherein the texture atlas comprises a view dependent portion and a view-independent portion, wherein the texture atlas comprises an index of triangles, each representing one of the visible portions of the objects, and wherein the index of triangles indicates which of the triangles are visible relative to a given viewpoint;
sending the texture atlas to a client device;
determining, subsequent to sending the texture atlas, a first subset of the visible portions of the objects for which shading information is to be re-generated and a second subset of the visible portions of the objects for which elements of the first shading information are to be reused, wherein the first subset comprises visible portions of objects for which shading is view-dependent and the second subset comprises visible portions of objects for which shading is view-independent, and wherein the determining comprises generating an indication of the triangles for which shading information is to be generated based at least on the index of triangles;
generating second shading information for the first subset relative to a second viewpoint;
updating the texture atlas to include the second shading information for the first subset and the elements of the first shading information for the second subset; and
sending the updated texture atlas to the client device, the updated texture atlas being configured for rendering images of the visible portions of the objects from multiple viewpoints.

2. The method of claim 1, further comprising:
determining, subsequent to sending the updated texture atlas, a third subset of the visible portions of the objects for which shading information is to be generated and a fourth subset of the visible portions of the objects for which elements of the shading information in the updated texture atlas are to be reused;
generating third shading information for the third subset relative to a third viewpoint;
further updating the texture atlas to include the third shading information for the third subset and the elements of the shading information in the updated texture atlas for the fourth subset; and
sending the further updated texture atlas to the client device, the further updated texture atlas being configured for rendering images of the visible portions of the objects from multiple viewpoints.

3. The method of claim 1, wherein determining the first subset and the second subset is dependent on one of more of: a lighting of one of the visible portions of the objects, a difference between the first viewpoint and the second viewpoint, a relative geometry of two or more of the visible portions of the objects, an animation of one or more of the visible portions of the objects, or a material of one of the visible portions of the objects.

4. The method of claim 1, further comprising, prior to generating the second shading information, overriding the determining of the first subset and the second subset by moving a visible portion of an object from the first subset to the second subset or moving a visible portion of an object from the second subset to the first subset, the overriding being dependent on an application context of an application for which the texture atlas was generated or on a motion detected in an application for which the texture atlas was generated.

5. The method of claim 1, wherein a rate at which shading information is generated for the first subset is higher than a rate at which shading information is generated for the second subset.

6. The method of claim 1, wherein the method further comprises:
compressing the second shading information with which the first subset was shaded using a first compression ratio; and
compressing the elements of the first shading information with which the second subset was shaded using a second compression ratio that is lower than the first compression ratio; and
updating the texture atlas comprises storing, in the texture atlas, the compressed second shading information and the compressed elements of the first shading information.

7. The method of claim 1, wherein updating the texture atlas comprises:
storing the second shading information with which the first subset was shaded in the view-dependent portion of the texture atlas; and
storing the elements of the first shading information with which the second subset was shaded in the view-independent portion of the texture atlas.

8. The method of claim 1, wherein updating the texture atlas comprises:
storing the second shading information with which the first subset was shaded in the texture atlas; and
storing the second subset of the visible portions of the objects in the texture atlas as first image data shaded using the elements of the first shading information.

9. The method of claim 1, wherein determining the first subset and the second subset comprises using a machine learning model to predict which of the visible portions of the objects are likely to appear differently relative to the second viewpoint than they appeared relative to the first viewpoint.

10. One or more computer-readable non-transitory storage media embodying software that is operable when executed to:
generate first shading information for visible portions of objects relative to a first viewpoint;
store, in a texture atlas, the first shading information, wherein the texture atlas comprises a view dependent portion and a view-independent portion, wherein the texture atlas comprises an index of triangles, each representing one of the visible portions of the objects, and wherein the index of triangles indicates which of the triangles are visible relative to a given viewpoint;
send the texture atlas to a client device;
determine, subsequent to sending the texture atlas, a first subset of the visible portions of the objects for which shading information is to be re-generated and a second subset of the visible portions of the objects for which elements of the first shading information are to be reused, wherein the first subset comprises visible portions of objects for which shading is view-dependent and the second subset comprises visible portions of objects for which shading is view-independent, and wherein the determining comprises generating an indication of the triangles for which shading information is to be generated based at least on the index of triangles;
generate second shading information for the first subset relative to a second viewpoint;
update the texture atlas to include the second shading information for the first subset and the elements of the first shading information for the second subset; and
send the updated texture atlas to the client device, the updated texture atlas being configured for rendering images of the visible portions of the objects from multiple viewpoints.

11. The media of claim 10, wherein the software is further operable when executed to, prior to generating the second shading information, override the determining of the first subset and the second subset by moving a visible portion of an object from the first subset to the second subset or moving a visible portion of an object from the second subset to the first subset, the overriding being dependent on an application context of an application for which the texture atlas was generated or on a motion detected in an application for which the texture atlas was generated.

12. The media of claim 10, wherein at least one of a rate at which shading information is generated, a compression rate with which shading information is compressed for storage in the texture atlas, or a portion of the texture atlas in which shading information is stored is different for the first subset than for the second subset.

13. The media of claim 10, wherein to determine the first subset and the second subset, the software is further operable when executed to use a machine learning model to predict which of the visible portions of the objects are likely to appear differently relative to the second viewpoint than they appeared relative to the first viewpoint.

14. A computing device comprising:
one or more processors; and
one or more computer-readable non-transitory storage media coupled to one or more of the processors and comprising program instructions operable when executed by one or more of the processors to cause the system to:
generate first shading information for visible portions of objects relative to a first viewpoint;
store, in a texture atlas, the first shading information, wherein the texture atlas comprises a view dependent portion and a view-independent portion, wherein the texture atlas comprises an index of triangles, each representing one of the visible portions of the objects, and wherein the index of triangles indicates which of the triangles are visible relative to a given viewpoint;
send the texture atlas to a client device;
determine, subsequent to sending the texture atlas, a first subset of the visible portions of the objects for which shading information is to be re-generated and a second subset of the visible portions of the objects for which elements of the first shading information are to be reused, wherein the first subset comprises visible portions of objects for which shading is view-dependent and the second subset comprises visible portions of objects for which shading is view-independent, and wherein the determining comprises generating an indication of the triangles for which shading information is to be generated based at least on the index of triangles;
generate second shading information for the first subset relative to a second viewpoint;

update the texture atlas to include the second shading information for the first subset and the elements of the first shading information for the second subset; and send the updated texture atlas to the client device, the updated texture atlas being configured for rendering images of the visible portions of the objects from multiple viewpoints.

15. The computing device of claim 14, wherein the program instructions are further operable when executed by one or more of the processors to cause the system to, prior to generating the second shading information, override the determining of the first subset and the second subset by moving a visible portion of an object from the first subset to the second subset or moving a visible portion of an object from the second subset to the first subset, the overriding being dependent on an application context of an application for which the texture atlas was generated or on a motion detected in an application for which the texture atlas was generated.

16. The computing device of claim 14, wherein at least one of a rate at which shading information is generated, a compression rate with which shading information is compressed for storage in the texture atlas, or a portion of the texture atlas in which shading information is stored is different for the first subset than for the second subset.

17. The computing device of claim 14, wherein to determine the first subset and the second subset, the program instructions are further operable when executed by one or more of the processors to cause the system to use a machine learning model to predict which of the visible portions of the objects are likely to appear differently relative to the second viewpoint than they appeared relative to the first viewpoint.

* * * * *